(12) United States Patent
Iguchi

(10) Patent No.: US 9,020,413 B2
(45) Date of Patent: Apr. 28, 2015

(54) SELECTIVELY CHANGING PRINTING ORDER OF PRINT DATA DEPENDING ON SELECTED BINDING PROCESS

(75) Inventor: Shunsuke Iguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/219,037

(22) Filed: Aug. 26, 2011

(65) Prior Publication Data

US 2012/0069367 A1    Mar. 22, 2012

(30) Foreign Application Priority Data

Sep. 21, 2010  (JP) ................................. 2010-211403
Jul. 11, 2011  (JP) ................................. 2011-153272

(51) Int. Cl.
*G03G 15/00*  (2006.01)
*G06K 15/02*  (2006.01)

(52) U.S. Cl.
CPC ........ *G03G 15/6544* (2013.01); *G06K 15/1809* (2013.01)

(58) Field of Classification Search
USPC .................................................. 399/407, 408
See application file for complete search history.

(56) References Cited

U.S. PATENT DOCUMENTS

| 7,847,968 | B2 | 12/2010 | Abiko |
| 8,897,692 | B2 | 11/2014 | Kiriyama |
| 2005/0265765 | A1* | 12/2005 | Honmochi et al. ........... 399/408 |
| 2007/0081180 | A1* | 4/2007 | Abiko .......................... 358/1.13 |
| 2009/0225343 | A1 | 9/2009 | Tominaga |
| 2009/0252545 | A1* | 10/2009 | Sasaki ........................... 399/410 |
| 2009/0263212 | A1* | 10/2009 | Sasaki et al. ...................... 412/7 |
| 2012/0025440 | A1 | 2/2012 | Kiriyama |

FOREIGN PATENT DOCUMENTS

| CN | 101533242 A | 9/2009 |
| JP | 2003-39852 A | 2/2003 |
| JP | 2009-63818 A | 3/2009 |
| JP | 2009-223405 | 10/2009 |
| JP | 2010-143646 | 7/2010 |
| JP | 2012-030416 A | 2/2012 |
| KR | 2007-0038920 | 4/2007 |

OTHER PUBLICATIONS

Aug. 13, 2014 Chinese Official Action in Chinese Patent Appln. No. 201110282954.2.

* cited by examiner

*Primary Examiner* — Eric A Rust
(74) *Attorney, Agent, or Firm* — Fitzpatrick, Cella, Harper & Scinto

(57) ABSTRACT

In a printing apparatus, a method of controlling the same, and an information processing apparatus, a job for printing front cover image data, main body image data, and back cover image data is received. In the case where the received job is designated to bound printed sheets using rings, the image data is arranged into the printing order of main body image data, front cover image data, and back cover image data or the printing order of back cover image data, front cover image data, and main body image data, after which printing is executed based on the image data in the arranged printing order.

7 Claims, 22 Drawing Sheets

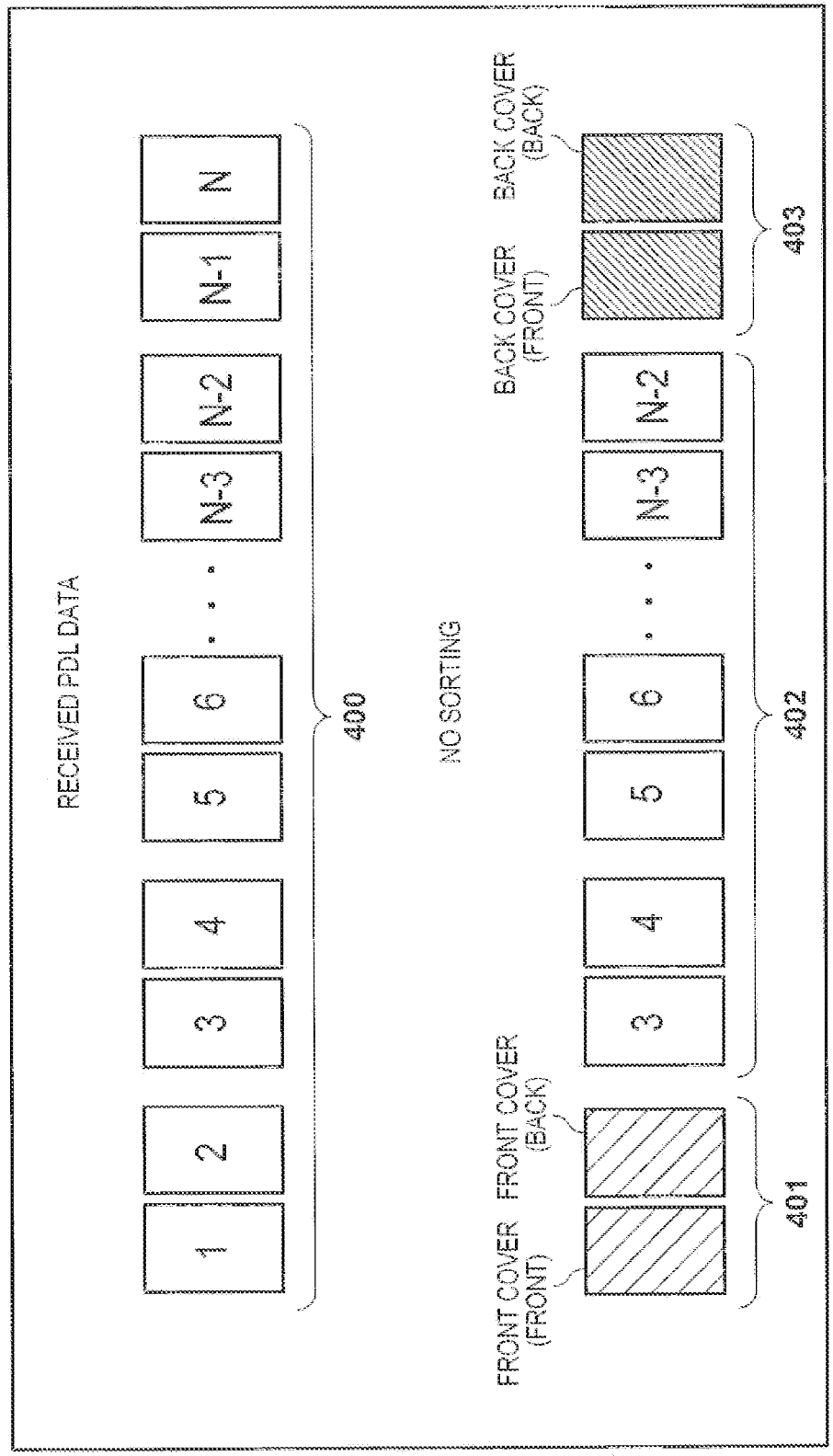

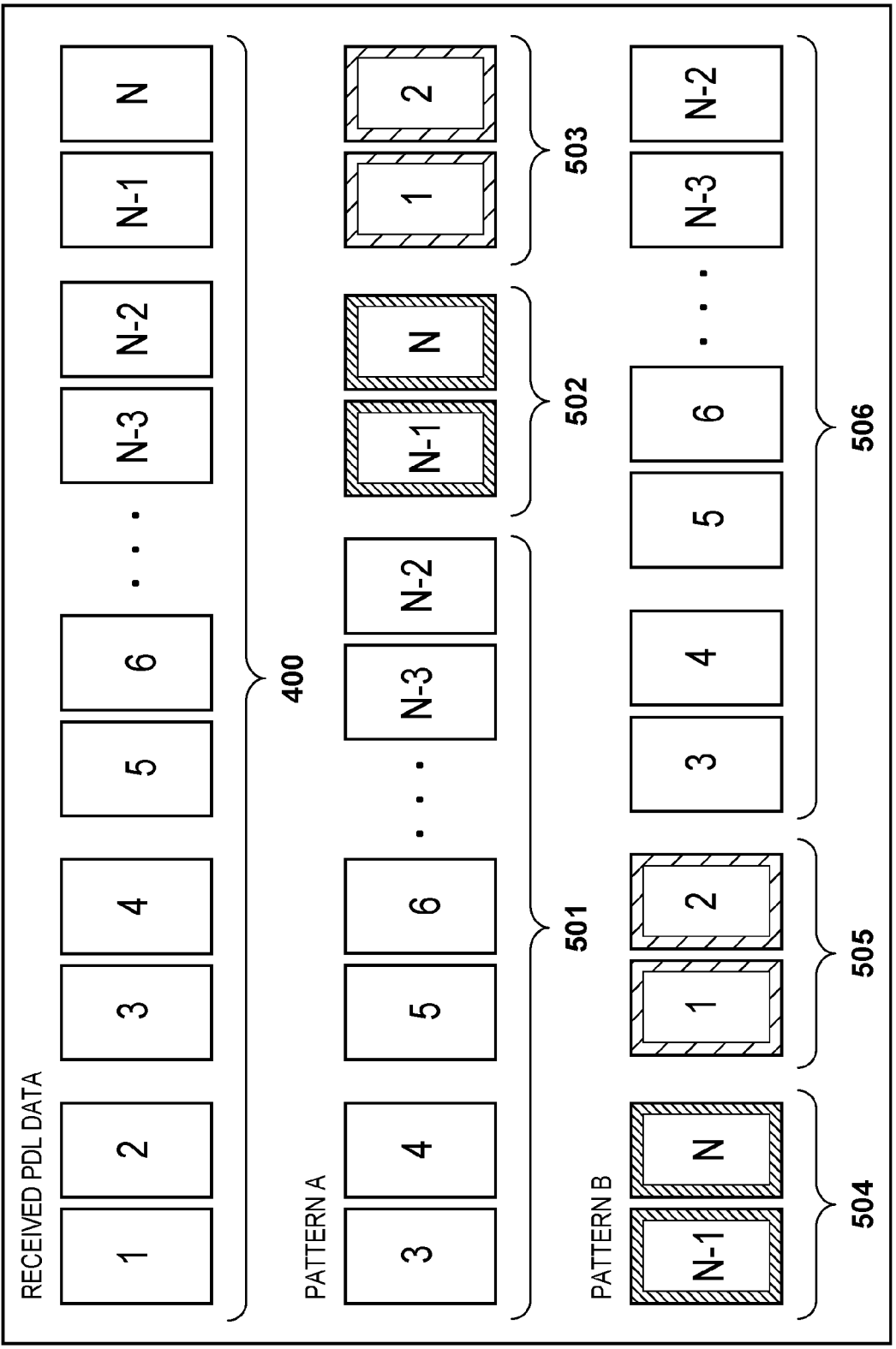

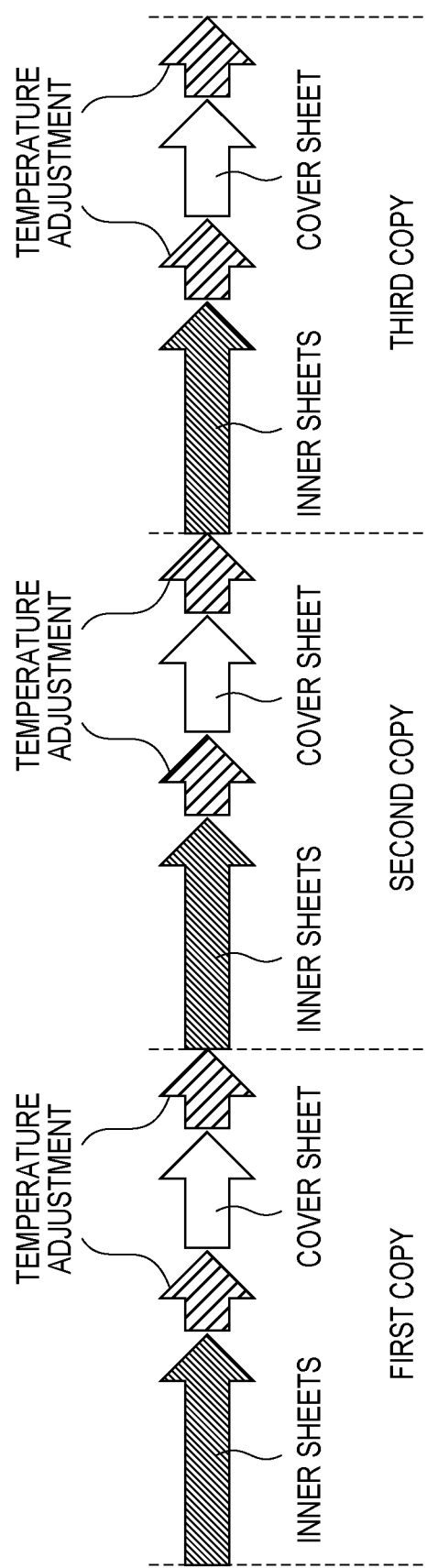

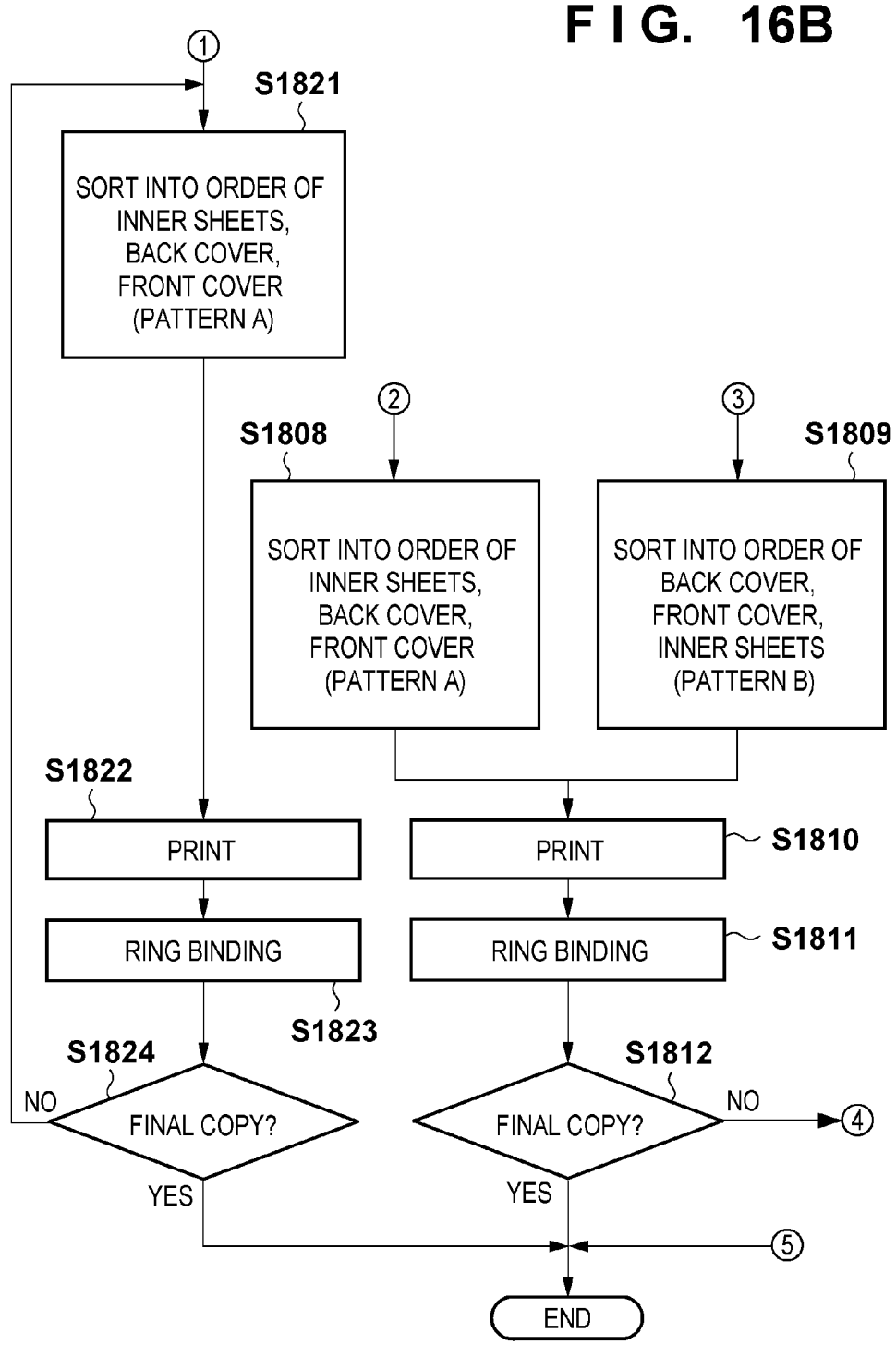

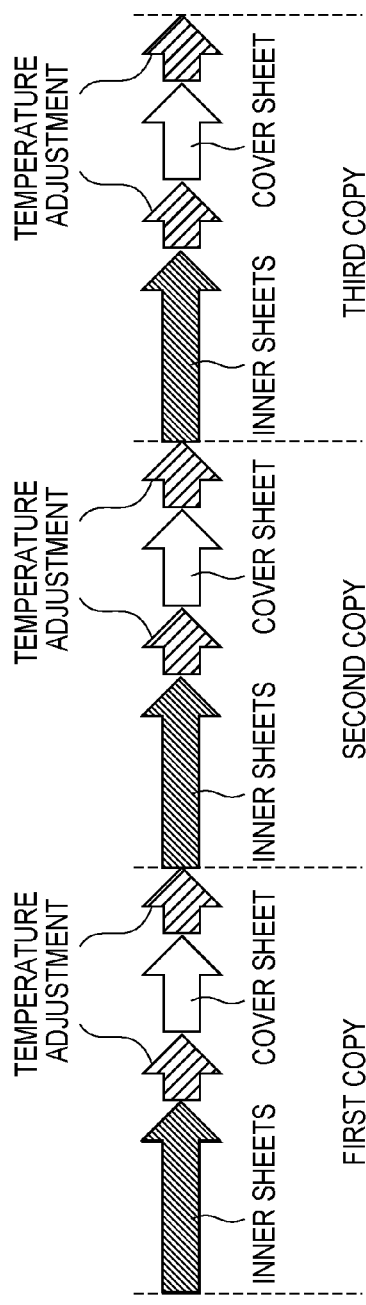
F I G. 18A
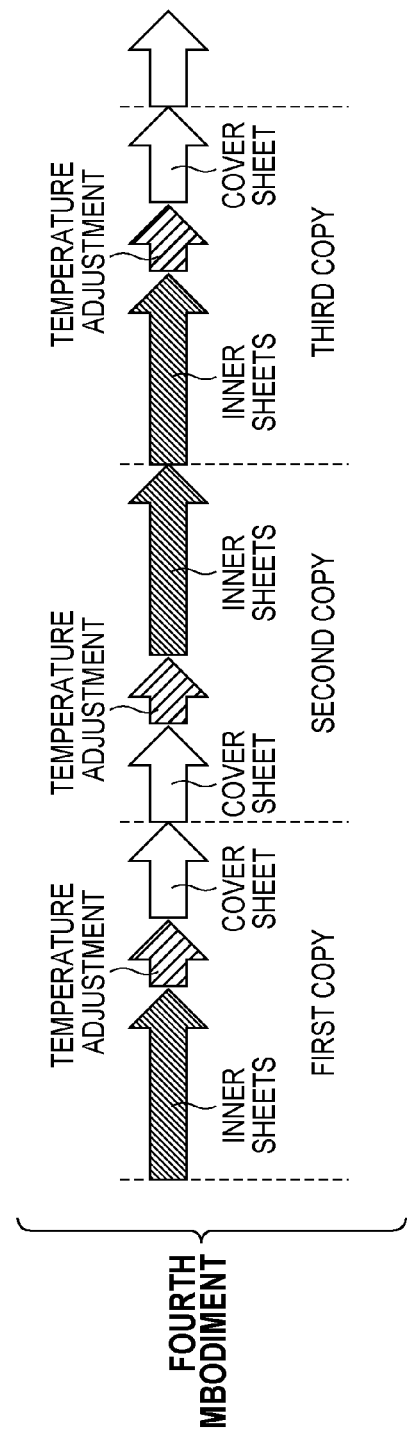
F I G. 18B

SELECTIVELY CHANGING PRINTING ORDER OF PRINT DATA DEPENDING ON SELECTED BINDING PROCESS

BACKGROUND OF THE INVENTION

1. Field of the Invention

The present invention relates to printing apparatuses and methods of controlling the same, and information processing apparatuses.

2. Description of the Related Art

Conventional ring binding apparatuses, which punch holes in printed material using a puncher and then bind that printed material together using wire-shaped rings, are known.

FIGS. 2A and 2B are diagrams illustrating examples of rings used in ring binding.

Rings 201 are what are known as double-loop rings, and are created by bending a single wire back upon itself. As shown in FIG. 2A, prior to binding, the rings 201 are in a C-shape. By applying pressure to these C-shaped rings and closing the rings, the wire deforms in the manner shown in FIG. 2B; the rings become circles as a result, and prevent paper or the like from coming loose.

In ring binding, a binding position 202 is created when carrying out the aforementioned crimp binding. The binding position 202 has a poor appearance, and because areas where the wire has been cut appear at the upper and lower ends thereof, this position has a poor feel as well. Generally speaking, when ring binding is carried out by hand, the binding is performed so that the binding position is hidden immediately in front of the back cover or immediately behind the front cover, so that the binding position does not appear at the rear of the bound material.

Japanese Patent Laid-Open No. 2003-039852, for example, discloses a technique for a configuration in which a cover sheet large enough to enclose the inner sheets (that is, the body of the volume) is folded and holes are punched at the fold in order to hide the binding position, so that the binding position does not appear at the rear of the bound material.

FIGS. 3A and 3B are schematic diagrams illustrating an example of a ring binding process.

In order to hide the binding position 202, the back cover 303 and the front cover 304 are placed over inner sheets 302, as shown in FIG. 3A, and holes are punched therethrough; the rings 201 are passed through the holes that have been punched, and are then closed by compressing the rings 201 from above and below. Then, as shown in FIG. 3B, the front cover 304 is rotated along the rings 201, which makes it possible to obtain a bound material in which the binding position 202 has been hidden.

In-line type ring binding apparatuses that carry out this type of ring binding on sheets that have been printed and transported by a printing apparatus have been considered in recent years.

However, carrying out ring binding using an in-line type ring binding apparatus presents the following problems.

FIG. 4 is a diagram illustrating conventional received page description language (PDL) data and a conventional page layout used for binding.

Generally speaking, page description language (PDL) data 400 received by a printing apparatus is sorted in order from the first page to an Nth page, including a cover sheet. In the case where, upon receiving such PDL data, the printing apparatus is to carry out double-sided printing, that printing apparatus prints, in order, a front cover (front and back) 401, inner sheets (front and back) 402, and a back cover (front and back) 403. When binding using staples, bound material having the correct order can be obtained by printing the sheets in this order, stacking the printed sheets, and stapling the sheets together.

However, when using an in-line type ring binding apparatus, if the sheets that have been printed in the order starting with the front cover (front and back) 401, the inner sheets (front and back) 402, and the back cover (front and back) 403 are stacked in that order and bound as-is, the binding cannot be carried out so that the binding position 202 appears at the rear.

In addition, as described with reference to FIG. 3B, if binding is to be carried out so that the binding position is hidden, it is necessary to create the data so that the data of the cover sheet is previous to or following the data of the inner sheets in advance when creating the print data. Furthermore, such print data, in which the data of the cover sheet is previous to or following the data of the inner sheets, cannot be used in staple binding, and it is thus necessary for a user to expressly change the position of the cover sheet depending on whether he or she will carry out ring binding or staple binding.

SUMMARY OF THE INVENTION

An aspect of the present invention is to eliminate the above-mentioned problems with conventional technology.

A feature of the present invention is to provide a system that improves the quality of printed material and operability by arranging pages corresponding to a job for binding using rings into body—front cover—back cover or back cover—front cover—body.

According to an aspect of the present invention, there is provided a printing apparatus comprising: a reception unit configured to receive a job for printing front cover image data, main body image data, and back cover image data; a control unit configured to, in the case where the job received by the reception unit is designated to bound printed sheets using rings, arrange the printing order of the image data of the received job into the main body image data, the front cover image data, and the back cover image data or into the back cover image data, the front cover image data, and the main body image data; and a print unit configured to execute printing based on the image data in the printing order arranged by the control unit.

According to an aspect of the present invention, there is provided a control method for controlling a printing apparatus that prints an image onto a recording medium, the image being transferred onto the recording medium and fixed onto the recording medium by a fixing device, the method comprising: determining whether or not to bind the recording medium using rings; determining whether or not it is necessary to change a temperature setting of the fixing device in accordance with the type of the recording medium; and in the case where it has been determined that the recording medium is to be bound using rings and it has been determined that it is necessary to change the temperature setting of the fixing device, printing so that the printing of one of multiple copies to be printed is started from printing that uses the same type of recording medium as the recording medium used in the final printing of a copy that is previous to the one of multiple copies.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating received page description language (PDL) data and a page layout for ring binding.

FIG. 5 is a diagram illustrating the page configuration and printing order of a print job according to an embodiment of the present invention.

FIG. 15 is a diagram illustrating printing time and temperature adjustment time in a ring binding job.

FIGS. 16A and 16B are flowcharts for describing a control process carried out by a controller in a printing apparatus according to an embodiment of the present invention.

FIGS. 18A and 18B are diagrams illustrating a correlation between a ring binding job process (18A) and a ring binding job process according to a first embodiment (18B).

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

<Apparatus Configuration>

Figure 1:
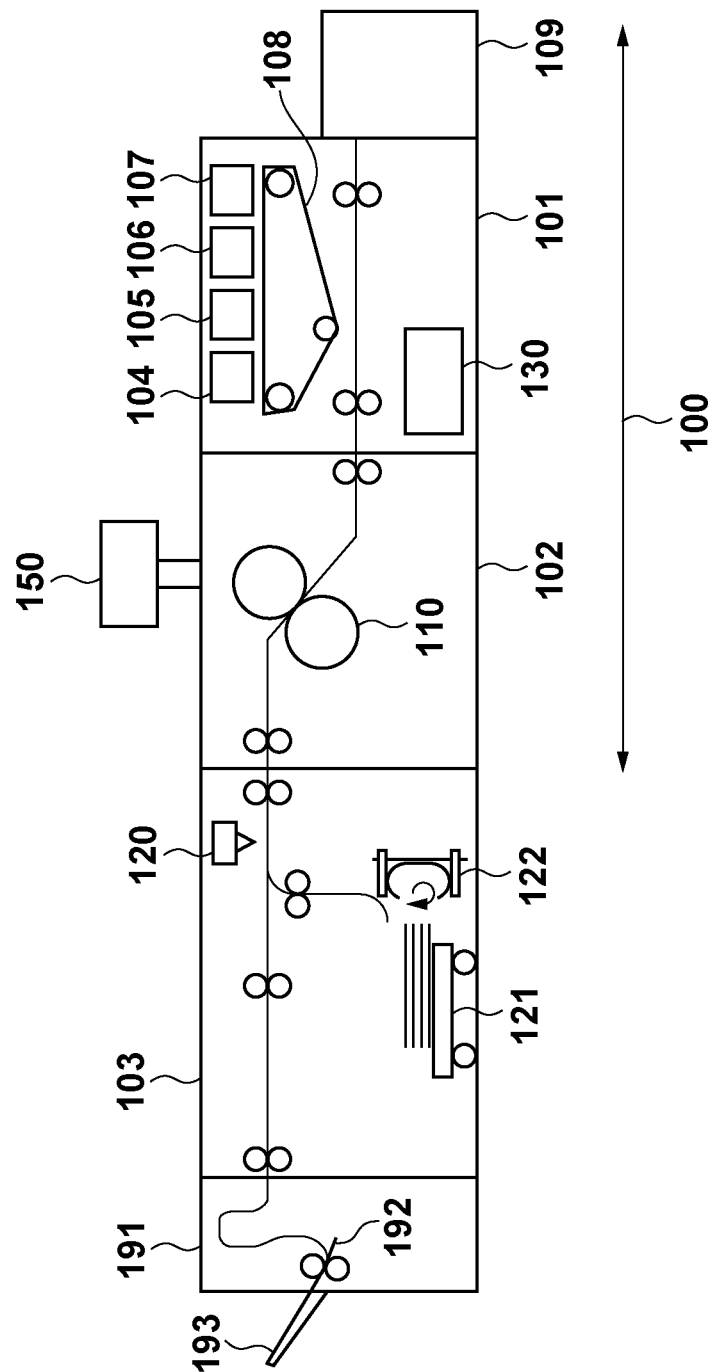
FIG. 1 is a block diagram illustrating a printing apparatus that executes printing for ring binding according to an embodiment of the present invention.
Figure 2A:
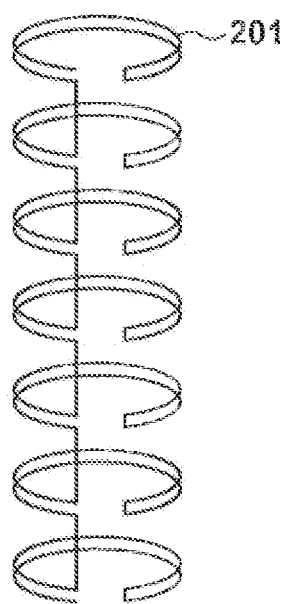
FIGS. 2A and 2B are diagrams illustrating examples of rings used in ring binding.
Figure 2B:
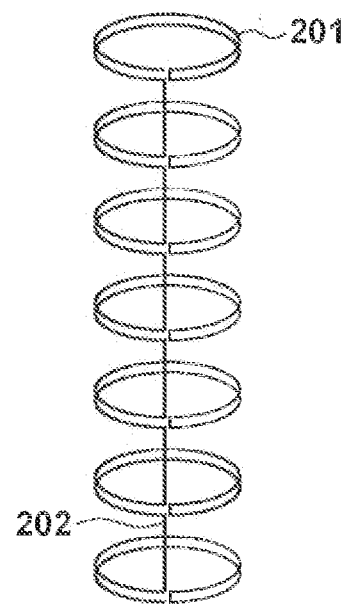

FIG. 1 is a block diagram illustrating a printing apparatus that executes printing for ring binding according to an embodiment of the present invention.

A printing apparatus 100 includes a development station 101, a fixing station 102, and a paper feed deck 109. A controller 130 is a control unit that controls the various constituent elements. A console unit 150 includes an LCD/touch panel, and is used by a user of the printing apparatus to confirm the status of printing, to make various types of settings, and so on. In developers 104 through 107, one each of which is provided for the CMYK colors respectively, an image that has been input from the controller 130 is developed on a photosensitive drum (not shown) that is housed within each developer, and a toner image is formed upon the photosensitive drum by toner adhering to a developing portion. The developed CMYK toner images are first transferred onto an intermediate transfer belt 108, and are then transferred onto a sheet (a recording medium) that has been supplied from the paper feed deck 109. The sheet onto which the toner images have been transferred in this manner is sent to the fixing station 102, where heat and pressure are applied to the sheet by fixing rollers 110. As a result, the toner is melted and fixed upon the sheet, which completes the printing process.

A ring binding apparatus 103 is directly connected to the fixing station 102 of the printing apparatus 100. The printed sheets that are sent from the printing apparatus 100 are input into the ring binding apparatus 103, and in the case where the job is a ring binding job, a puncher 120 punches holes suitable for rings in those sheets. Next, the sheets are sent to a stacking unit 121, where the sheets are stacked. When all of the sheets of a single volume have been stacked in the stacking unit 121 in this manner, a ring crimping unit 122 passes the rings through the holes in the stacked sheets in a rotating manner. After this, pressure is applied to the rings from above and below, crimping the rings and completing the binding.

It is thus possible to automatically carry out the process from printing to ring binding by employing the aforementioned control.

Meanwhile, a large-volume stacker, a saddle stitching apparatus, or the like can be connected downstream from the ring binding apparatus 103. The present embodiment will assume a case in which a saddle stitching apparatus 191 is connected. The saddle stitching apparatus 191 collects the sheets transported from the ring binding apparatus 103 in a stapling unit 192, and when a number of sheets that are to be stapled has been collected, the sheets are stapled; the sheets that have been stitched in this manner are then discharged to a discharge tray 193.

<Controller Configuration>

Figure 6:
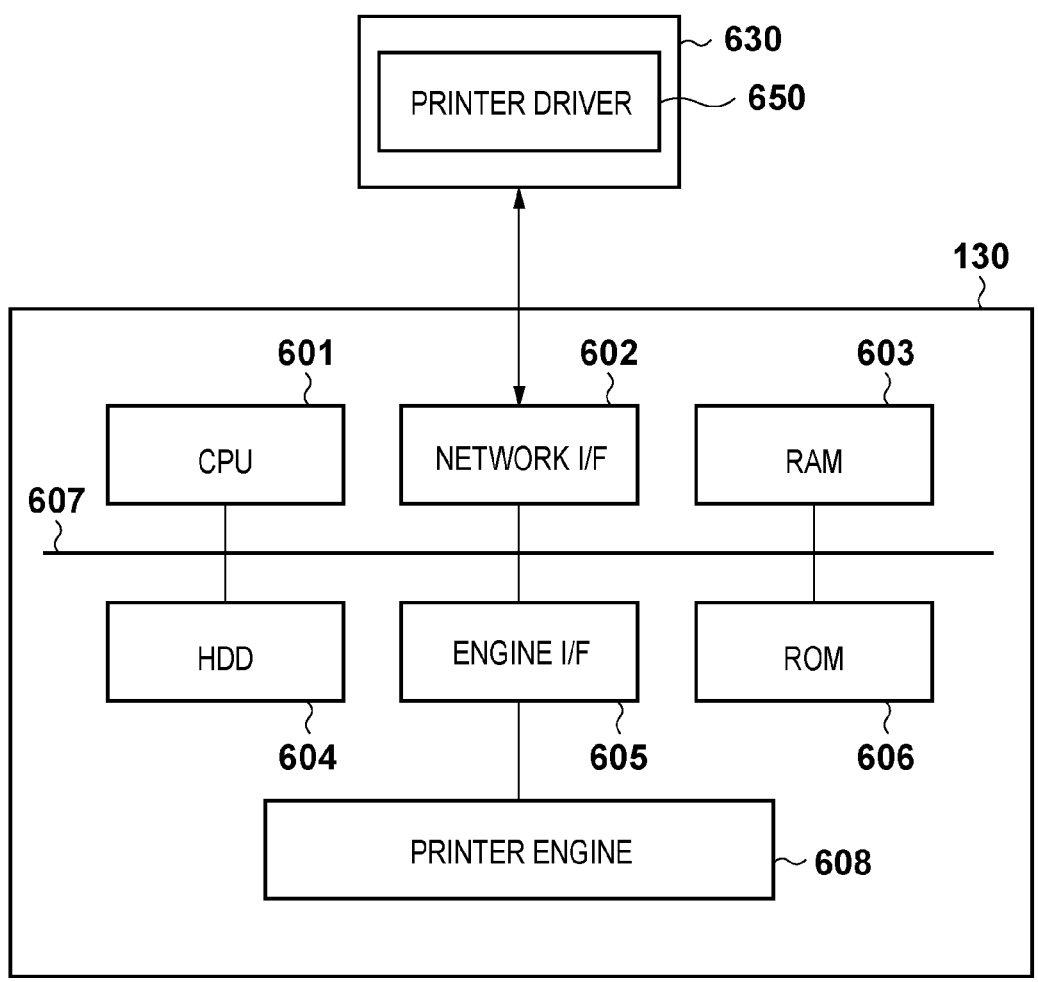
FIG. 6 is a block diagram illustrating the configuration of a controller of the printing apparatus and a connection to a client computer, according to an embodiment of the present invention.

FIG. 6 is a block diagram illustrating the configuration of the controller 130 of the printing apparatus, and a connection to a client computer, according to the present embodiment.

A central processing unit (CPU) 601 executes programs expanded in a RAM 603, and carries out control of and computations for the respective units within the apparatus. The RAM 603 is used as a storage area for programs, a temporary storage area for various types of data, and a working memory. A hard disk drive (HDD) 604 is a high-capacity storage device, and various types of control programs executed by the CPU 601 are installed therein. The HDD 604 is also used as a temporary storage area for various types of data that are to be processed. A ROM 606 stores a startup program (boot program), various types of settings information, and so on. When the printing apparatus is turned on, the boot program in the ROM 606 is launched, and an OS, control programs, and so on installed in HDD 604 are read out, expanded in the RAM 603, and loaded. Then, the CPU 601 executes processes in accordance with the programs expanded in the RAM 603, and executes various types of control processes, which will be mentioned later. A network interface (I/F) 602 communicates with other apparatuses, such as a client computer (information processing apparatus) 630, via an external network. An engine interface (I/F) 605 communicates with and controls a printer engine 608. The printer engine 608 includes the development station 101, the fixing station 102, the ring binding apparatus 103, the saddle stitching apparatus 191, and so on shown in FIG. 1. The CPU 601 is connected to the development station 101, the fixing station 102, and the ring binding apparatus 103 via signal lines, and controls the operations of these units by sending commands thereto via the signal lines. A system bus 607 is a bus that connects the CPU 601 to the aforementioned constituent elements, and communicates control signals, addresses, data, and so on.

A printer driver 650 is installed in the client computer 630. The printer driver 650 converts rendering commands from an application in the client computer into PDL data that can be output by the printing apparatus 100. In addition, the printer driver 650 adds various types of printing apparatus settings to the PDL data and sends the resulting data to the printing apparatus 100.

<Software Module Configuration>

Figure 7:
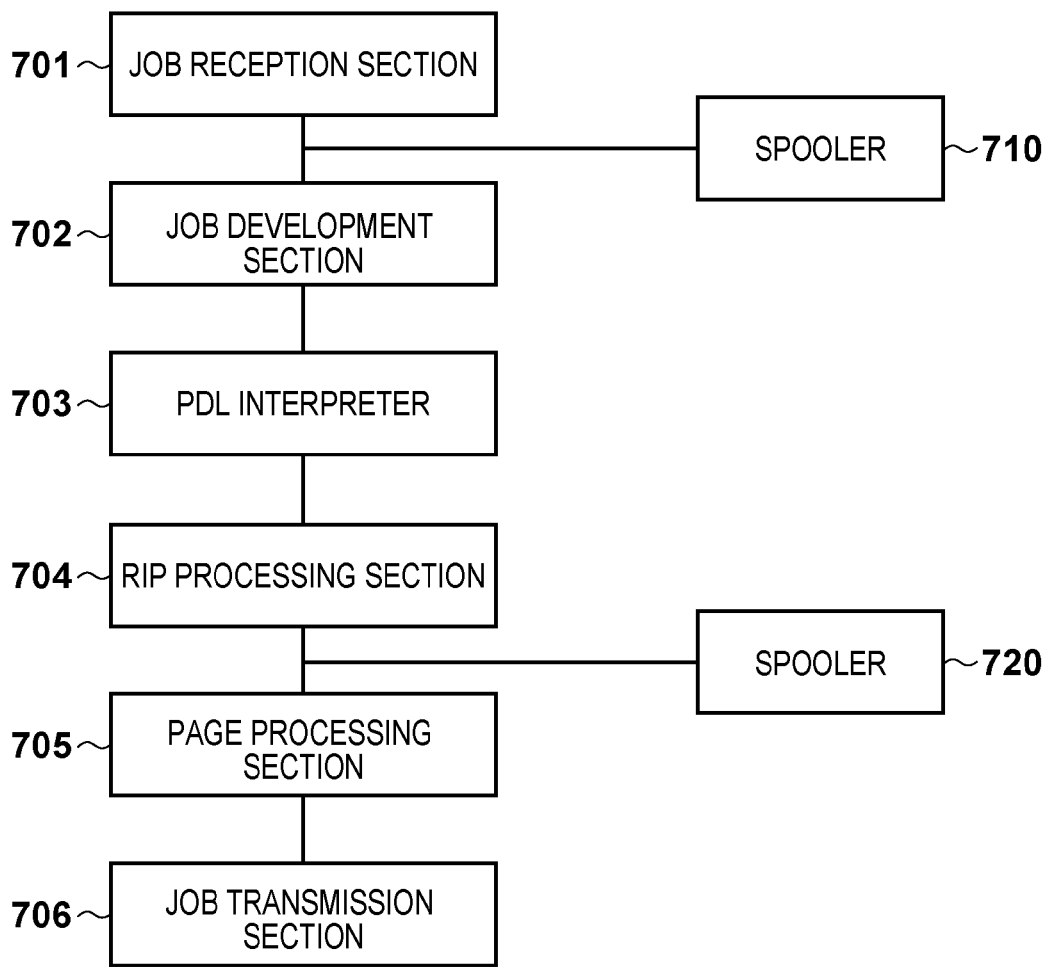
FIG. 7 is a block diagram illustrating software modules of a controller 130 according to an embodiment of the present invention.

FIG. 7 is a block diagram illustrating software modules of the controller 130 according to the present embodiment.

The functions of the various software modules are implemented by the CPU 601 executing control programs that have been expanded in the RAM 603.

A job reception section 701 receives print jobs via the network interface (I/F) 602, and temporarily stores those jobs in a spooler 710. A job development section 702 reads out and analyzes the print jobs stored in the spooler 710, develops those jobs, and passes the jobs to a PDL interpreter 703. The PDL interpreter 703 develops the PDL (page description language) data contained in those print jobs and converts the data to an intermediate data format. Here, the PDL data is, for example, Adobe PDF data.

A RIP processing section 704 receives the data that has been converted into the intermediate data format, converts that data into image data by carrying out a RIP process, and temporarily stores the resulting data in a spooler 720. A page processing section 705 carries out a process for arranging the order of the pages of the image data stored in the spooler 720. A job transmission section 706 transmits the image data that has been arranged in this manner to the printer engine 608 via the engine I/F 605, where printing is carried out. It should be noted that the spoolers 710 and 720 may be provided in the RAM 603, or may be provided in the HDD 604.

<Page Sorting Method>

FIG. 5 is a diagram illustrating the page configuration and printing order of a print job according to the first embodiment of the present invention. Although these descriptions assume a double-sided printing job, the print job may be a single-sided printing job or a job in which single-sided printing and double sided printing are intermixed.

A pattern in which the page configuration of PDL data 400 configured from N received pages is sorted in the order of inner sheets 501, a back cover 502, and a front cover 503 will be taken as a pattern A. Meanwhile, a pattern in which the pages are sorted in the order of a back cover 504, a front cover 505, and inner pages (the body of the volume) 506 will be taken as a pattern B. In the case of the pattern A, the received PDL data is sorted so that the first page and the second page that are printed on the front and back of the front cover 503 are sorted behind the final page (that is, the Nth page). In the case of the pattern B, meanwhile, the received PDL data is sorted so that the (N−1)th page and the Nth page that are printed on the front and back of the back cover 504 are sorted in front of the first page.

Figure 10A:
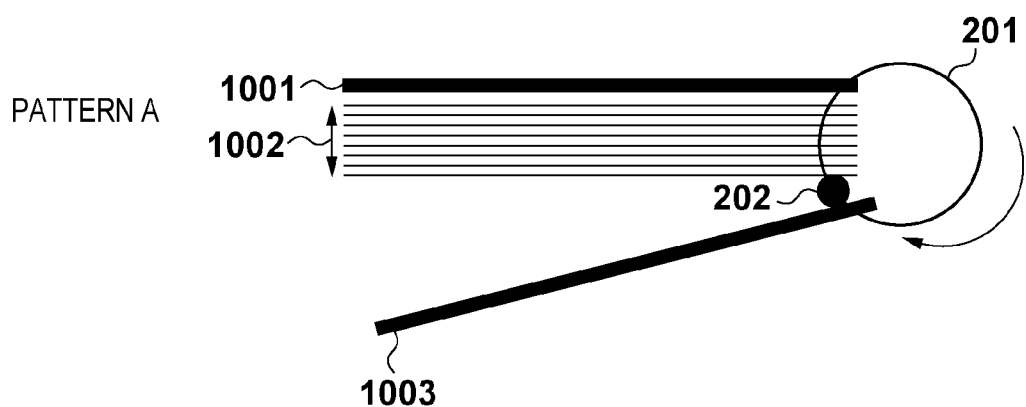
FIGS. 10A and 10B are diagrams illustrating results of ring binding according to an embodiment of the present invention.
Figure 10B:
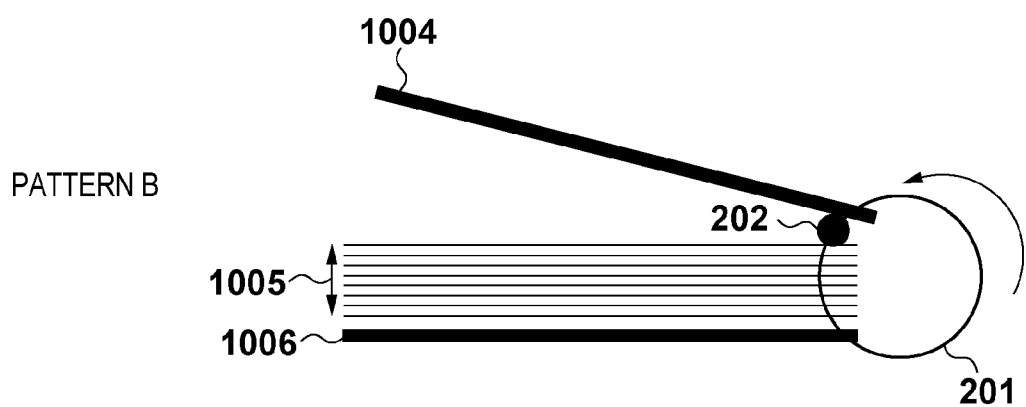

FIGS. 10A and 10B are diagrams illustrating results of ring binding according to the first embodiment.

In the aforementioned pattern A, ring binding is carried out by printing inner sheets 1002 (corresponding to 501 in FIG. 5) first and then printing a back cover 1001 (corresponding to 502 in FIG. 5) and a front cover 1003 (corresponding to 503 in FIG. 5). Accordingly, as shown in FIG. 10A, the front cover 1003 is rotated once along the rings 201, and is thus positioned in front of the inner sheets 1002. Through this, the binding position 202 is positioned immediately after the front cover 1003, and it can thus be seen that a final product that has been sorted in the intended order has been created.

On the other hand, FIG. 10B illustrates a case in which printing has been carried out according to the pattern B, where ring binding is carried out by printing a back cover 1004 (corresponding to 504 in FIG. 5), a front cover 1006 (corresponding to 505 in FIG. 5), and inner sheets 1005 (corresponding to 506 in FIG. 5) in that order. Here, the back cover 1004 is rotated once along the rings 201, and is thus positioned behind the inner sheets 1005. Through this, the binding position 202 is positioned immediately before the back cover 1004, and it can thus be seen that a final product that has been sorted in the intended order has been created.

In both the case of FIG. 10A and the case of FIG. 10B, a bound volume in which the binding position 202 is hidden by the front cover 1003 or the back cover 1004 can be created.

<Settings Window>

Figure 9:
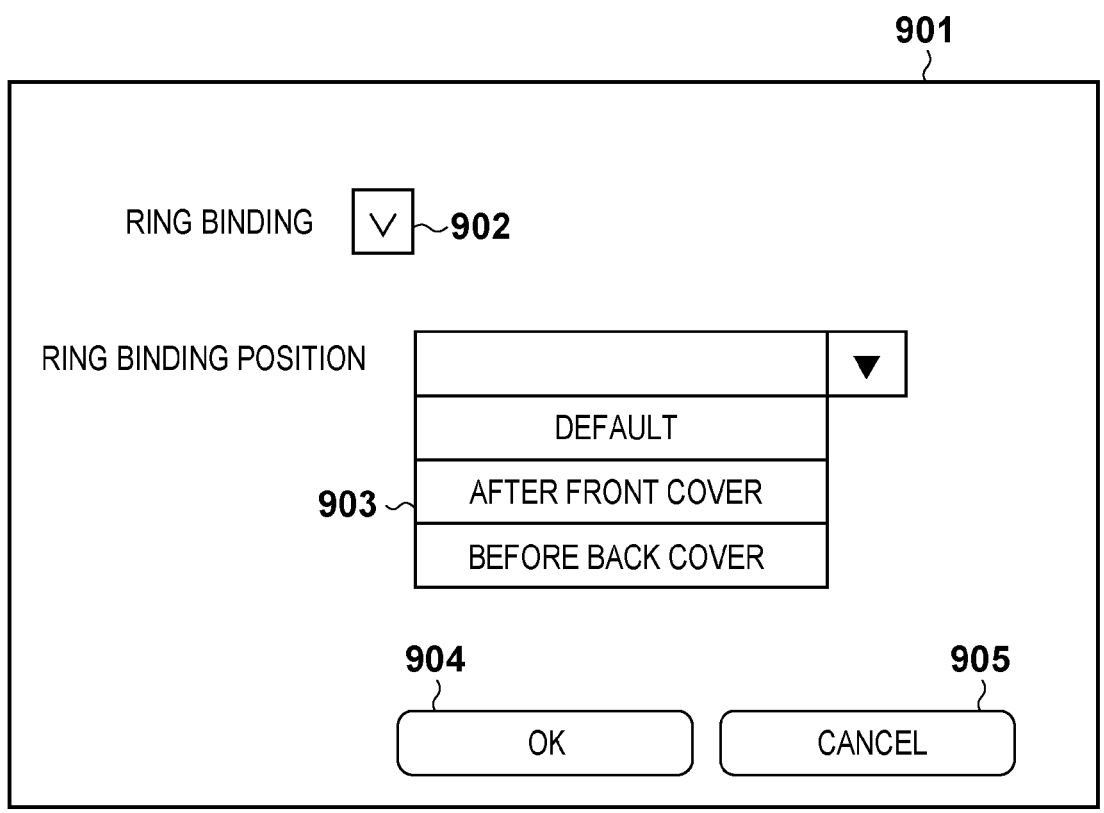
FIG. 9 is a diagram illustrating an console unit provided in a printing apparatus and a settings window displayed in a printer driver screen according to an embodiment of the present invention.

FIG. 9 is a diagram illustrating a settings window displayed in a screen of the console unit 150 provided in the printing apparatus 100 according to the first embodiment.

A settings window 901 is displayed in the console unit 150. When the settings window 901 is displayed, the console unit 150 accepts inputs from the user via the touch panel. The settings window 901 is configured of a checkbox 902 for setting whether or not to carry out ring binding, a pull-down menu 903 for setting the ring binding position, an OK button 904, and a cancel button 905. The pull-down menu 903 used to set the ring binding position is grayed out in the case where the checkbox 902, which sets whether or not to carry out ring binding, is unchecked. The pull-down menu 903 used to set the ring binding position is configured of three choices, or "default", "after front cover", and "before back cover". "Default" is a method that prints in the same order as the received PDL data shown in FIG. 4, or in other words, the front cover 401, the inner sheets 402, and the back cover 403. "After front cover" corresponds to the pattern A shown in FIG. 5, whereas "before back cover" corresponds to the pattern B shown in FIG. 5.

When, after setting whether or not to carry out ring binding and setting the binding position in such a manner, the user presses the OK button 904, the controller 130 saves those settings in the RAM 603 or the HDD 604.

Note that the same type of settings window can be realized with the same configuration through the printer driver 650 installed in the client computer 630, which is connected via the network I/F 602, rather than in the console unit 150 provided in the printing apparatus 100. In such a case, information of whether or not to carry out ring binding and information indicating the binding position as set by the user is transmitted to the printing apparatus as part of the print job. The CPU 601 of the printing apparatus controls the printing operations in accordance with job setting information contained in the print job transmitted by the printer driver 650.

Note that in the case where information of whether or not to carry out ring binding and information indicating the binding position has been specified through both the console unit 150 and the printer driver 650, the information of whether or not to carry out ring binding and information indicating the binding position specified by the printer driver 650 is prioritized.

<Printing Flow of First Embodiment>

Next, control performed by the printing apparatus 100 according to the first embodiment will be described.

Figure 8:
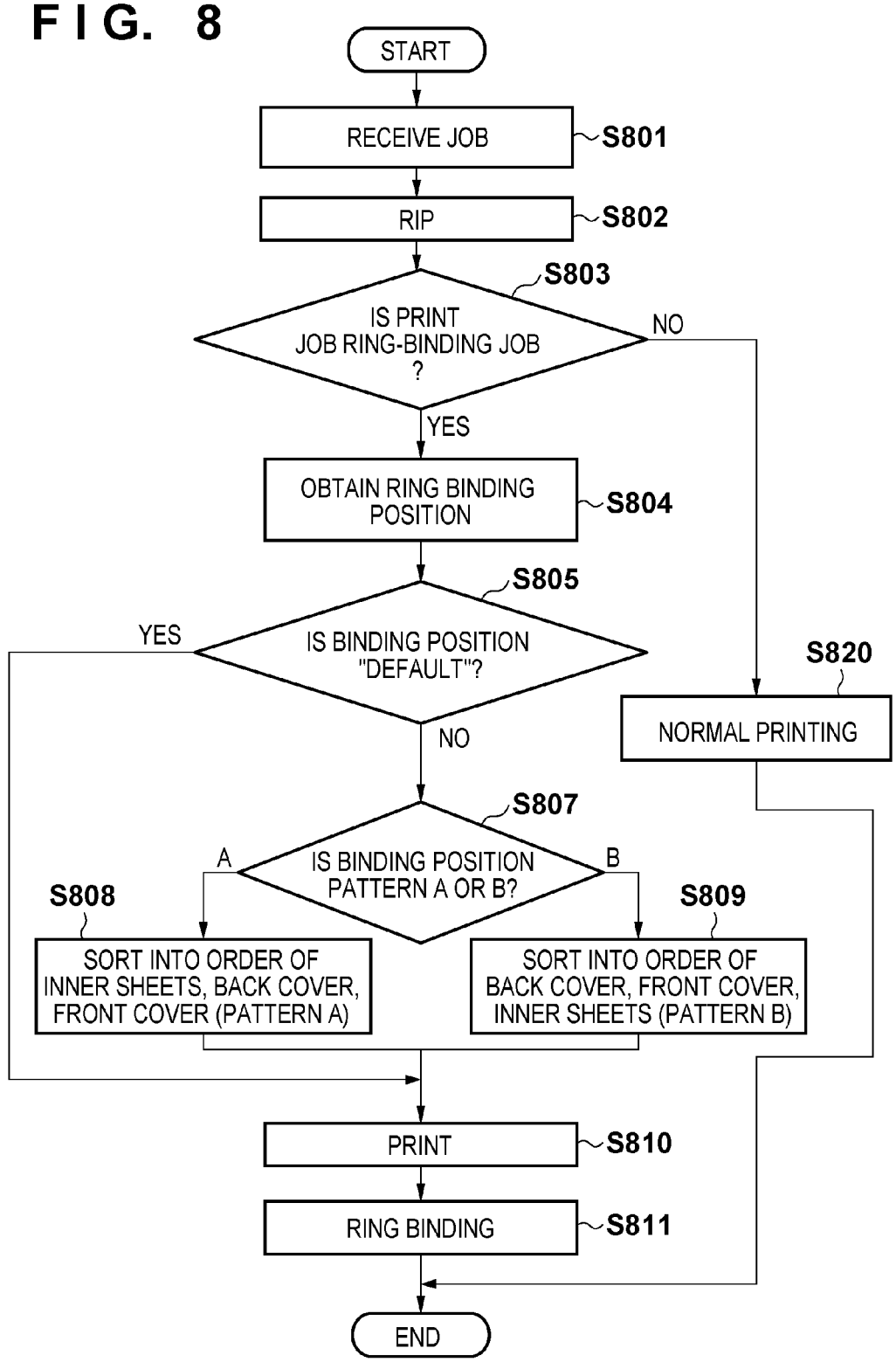
FIG. 8 is a flowchart for describing control performed in a printing apparatus according to an embodiment of the present invention.

FIG. 8 is a flowchart for describing a control process carried out by the controller 130 of the printing apparatus 100 according to the first embodiment of the present invention. Note that the programs that execute these processes are read out from the ROM 606 and expanded in the RAM 603, and the processes indicated in this flowchart are executed by the CPU 601 executing those control programs.

First, in step S801, the processing performed by the CPU 601 is commenced, and a print job is received via the network I/F 602. Next, the procedure advances to step S802, where the job development section 702 passes the input print job to the PDL interpreter 703. Furthermore, the RIP processing section 704 generates image data from the intermediate data generated by the PDL interpreter 703, and stores that image data in the spooler 710, after which the procedure advances to step S803.

In step S803, the page processing section 705 analyzes the print job, and furthermore determines whether or not that print job is a job for ring binding by referring to the HDD 604 or the RAM 603. If it has been determined here that the print job is not for ring binding, the procedure advances to step S820, where normal printing is carried out and the procedure ends. For example, if the print job is a print job in which post-processing is not specified, a print job in which stapling is specified, or the like, the CPU 601 advances the procedure from step S803 to step S820, carries out normal printing in step S820, performs a stapling process on the printed material, and ends the procedure.

However, the procedure advances to step S804 in the case where it has been determined in step S803 that the input print job is a job for ring binding, whereupon the page processing section 705 further analyzes the input print job. The page processing section 705 analyzes the print job, and further obtains a ring binding position setting for that print job by referring to the HDD 604 or the RAM 603.

The procedure then advances to step S805, where the page processing section 705 determines whether or not the obtained ring binding position is "default". If it is determined here that the ring binding position is "default", the procedure advances to step S810, where the page processing section 705 transmits the data to the printer engine 608 via the job transmission section 706, after which printing is carried out by the printer engine 608 without sorting the pages. Next, in step S811, the ring binding apparatus 103 carries out ring binding directly, after which the procedure ends.

On the other hand, in the case where it has been determined in step S805 that the ring binding position is not "default", the procedure advances to step S807, where the page processing section 705 determines whether the obtained ring binding position corresponds to the pattern A or the pattern B. In the case where it has been determined that the ring binding position corresponds to the pattern A, the procedure advances to step S808, where the page processing section 705 sorts the pages according to the pattern A. On the other hand, in the case where it has been determined that the ring binding position corresponds to the pattern B, the procedure advances to step S809, where the page processing section 705 sorts the pages according to the pattern B. Next, the procedure advances to step S810, where the page processing section 705 transmits the data to the printer engine 608 via the job transmission section 706, after which printing is carried out according to the page order obtained by sorting according to the pattern A or the pattern B; then, in step S811, the ring binding apparatus 103 carries out ring binding directly, after which the procedure ends.

By controlling the printing as described thus far, it is possible, in a ring binding job, to create high-quality printed material that appropriately reflects the ring binding position based on the settings made by the user. Furthermore, because it is not necessary for the user to rearrange the pages, the operability is also improved. Further still, if the job is one in which staple binding is carried out, the printing is carried out without sorting the pages, and it is therefore not necessary for the user to rearrange the pages into a different page order based on the type of post-processing that is to be carried out.

Second Embodiment

Figure 11:
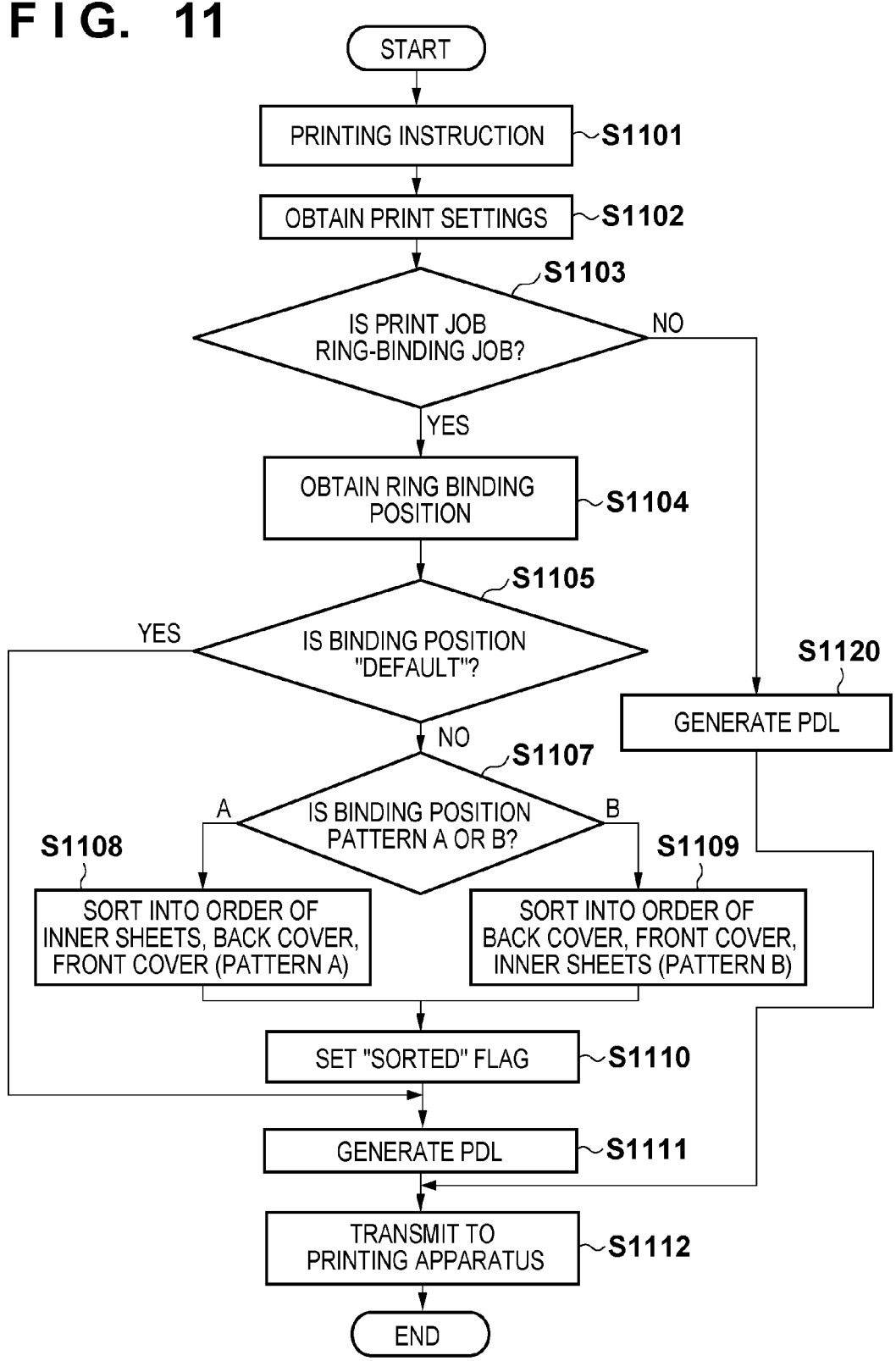
FIG. 11 is a flowchart for describing control carried out by a printer driver according to an embodiment of the present invention.

The first embodiment describes control carried out in the printing apparatus 100 in order to sort pages. A second embodiment, however, will describe a method in which the sorting of pages is carried out by the printer driver 650, which is installed in the client computer 630 in advance. The various steps shown in the flowchart illustrated in FIG. 11 are carried out by a CPU in the client computer 630 executing programs read out from a ROM in the client computer 630. Note that the configurations of the printing apparatus 100, the ring binding apparatus 103, and so on in the second embodiment are the same as those described in the first embodiment, and therefore descriptions thereof will be omitted.

FIG. 11 is a flowchart for describing control carried out by the printer driver 650 according to the second embodiment.

First, in step S1101, the processing performed by the printer driver 650 is commenced, and an instruction to execute printing is received from the user. Next, the procedure advances to step S1102, where the printer driver 650 obtains printing settings from the received execution instruction.

In step S1103, the printer driver 650 determines, based on the obtained printing settings, whether or not that print job is a job for ring binding. Here, if it has been determined that the print job is not for ring binding, the procedure advances to step S1120, where the printer driver 650 carries out normal PDL data generation; that data is then transmitted to the printing apparatus 100 in step S1112, after which the procedure ends. On the other hand, if it has been determined in step S1103 that the input print job is a job for ring binding, the procedure advances to step S1104, where the printer driver 650 obtains the ring binding position setting of the print job whose printing has been instructed.

Next, the procedure advances to step S1105, where it is determined whether or not the obtained ring binding position is "default". In the case where it has been determined that the ring binding position is "default", the procedure advances to step S1111, where the printer driver 650 generates PDL data without sorting the pages for which printing is instructed; that data is then transmitted to the printing apparatus in step S1112, after which the procedure ends. For example, if the print job is a print job in which post-processing is not specified, a print job in which stapling is specified, or the like, the procedure is advanced from step S1103 to step S1120, where the PDL data is generated and a process for stapling the printed material that has been printed is carried out; after this, the procedure ends.

On the other hand, in the case where it has been determined in step S1105 that the ring binding position is not "default", the procedure advances to step S1107, where the printer driver 650 determines whether the obtained ring binding position corresponds to the pattern A or the pattern B. In the case where it has been determined that the ring binding position corresponds to the pattern A, the procedure advances to step S1108, where the printer driver 650 sorts the pages according to the pattern A. On the other hand, in the case where it has been determined that the ring binding position corresponds to the pattern B, the procedure advances to step S1109, where the printer driver 650 sorts the pages according to the pattern B. Next, in step S1110, the printer driver 650 sets a "sorted" flag in the print job. The procedure then advances to step S1111, where the printer driver 650 generates PDL in the page order obtained by sorting the pages for which printing was instructed according to the pattern A or the pattern B. The procedure then advances to step S1112, where the printer driver 650 transmits the PDL data to the printing apparatus 100; after this, the procedure ends.

The printing apparatus 100 then carries out printing in accordance with the print job generated by the printer driver 650, without sorting the pages.

By controlling the printer driver 650 as described thus far, it is possible, in a ring binding job, to create high-quality printed material that appropriately reflects the ring binding position based on the settings made by the user. Furthermore, because it is not necessary for the user to rearrange the pages, the operability is also improved. Further still, if the job is one in which staple binding is carried out, the printing is carried out without sorting the pages, and it is therefore not necessary for the user to rearrange the pages into a different page order based on the type of post-processing that is to be carried out.

Third Embodiment

Next, a third embodiment of the present invention will be described. Note that the configurations of the printing apparatus 100, the ring binding apparatus 103, and so on in the third embodiment are the same as those described in the first embodiment, and therefore descriptions thereof will be omitted.

The sorting of pages carried out by the printing apparatus 100 in the first embodiment and the sorting of pages carried out by the printer driver 650 in the second embodiment makes it possible to implement ring binding at a binding position based on settings made by the user. However, if, despite the fact that the pages have been sorted by the printer driver 650, the pages are further sorted by the printing apparatus 100, the page order in the final product will differ from the intended page order.

Furthermore, a situation in which an error occurs in the ring binding apparatus, such as a tray being full, a paper jam, rings being exhausted, and so on can be considered. In such a case, it is possible to set a finishing apparatus capable of, for example, stapling, as an alternate output destination, rather can carrying out the ring binding. However, in the case where the printer driver 650 has already sorted the pages, there is a problem in that carrying out stapling will result in the pages not being printed in the intended page order.

In light of this, the present embodiment describes a method for solving such a problem.

Figure 12:
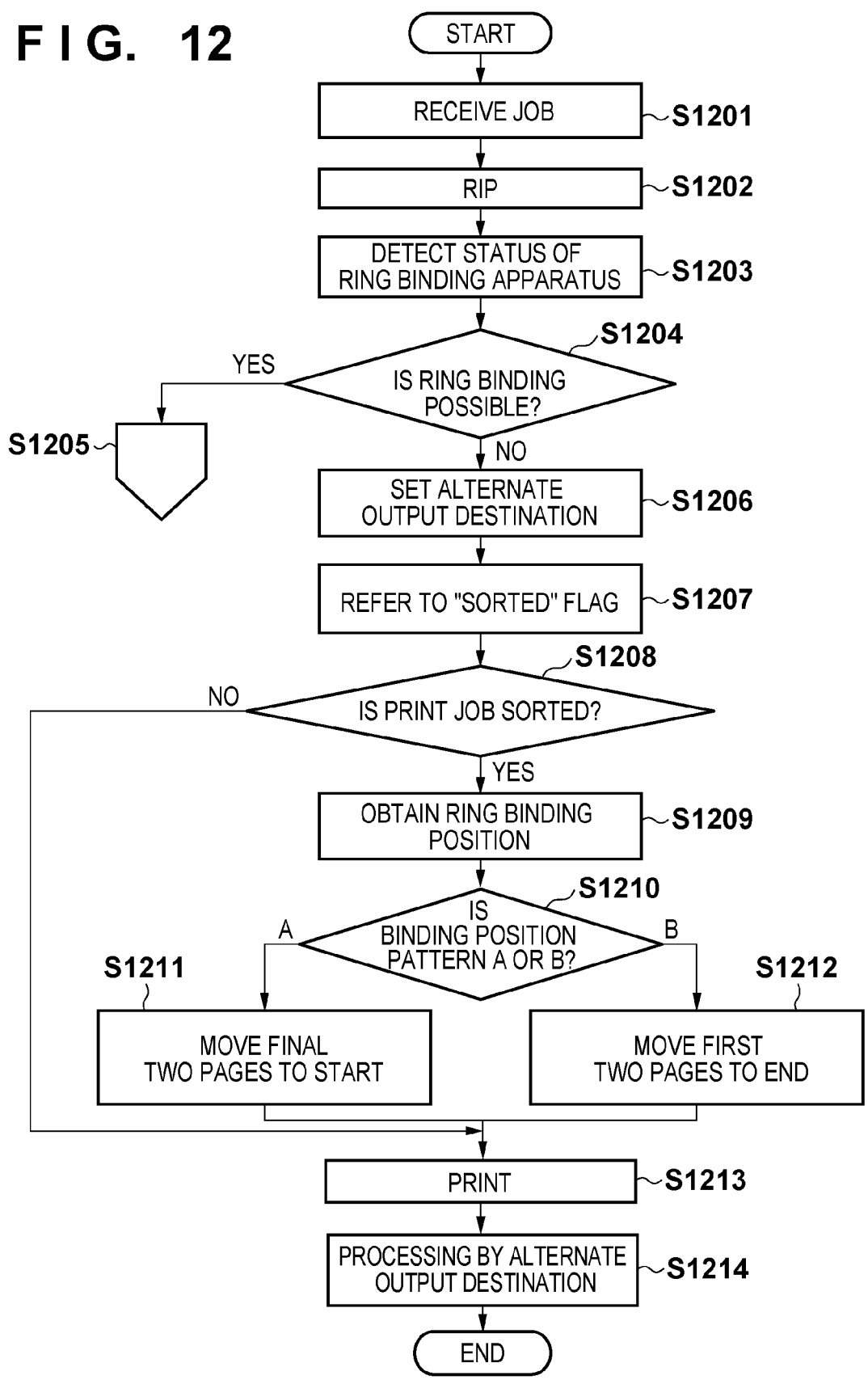
FIG. 12 is a flowchart for describing control performed in a printing apparatus according to an embodiment of the present invention.

FIG. 12 is a flowchart for describing control carried out by the printing apparatus 100 according to the third embodiment. The processes indicated in the flowchart in FIG. 12 are carried out by the CPU 601 reading out and executing programs stored in the ROM 606.

First, in step S1201, the processing performed by the CPU 601 is commenced, and a print job is received via the network I/F 602. Next, the procedure advances to step S1202, where the job development section 702 passes the input print job to the PDL interpreter 703. Furthermore, the RIP processing section 704 generates image data from the intermediate data generated by the PDL interpreter 703, and stores that image data in the spooler 710; the procedure then advances to step S1203.

Figure 13:
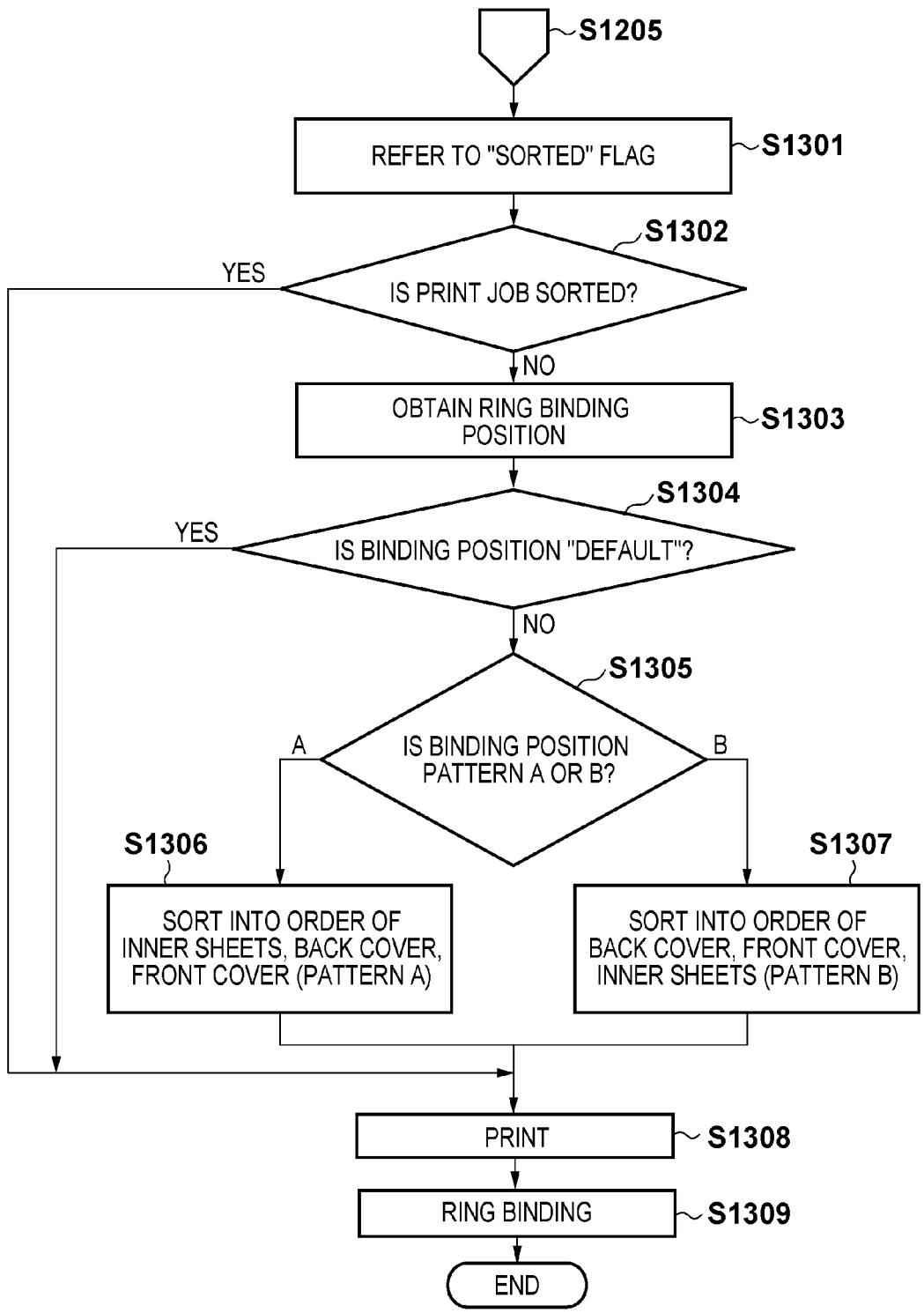
FIG. 13 is a flowchart for describing control performed in a printing apparatus according to an embodiment of the present invention.

In step S1203, the CPU 601 receives signals from various types of sensors provided in the ring binding apparatus 103, and detects the status of the ring binding apparatus 103 based on the received signals. Next, in step S1204, the CPU 601 refers to the detected status of the ring binding apparatus 103 and determines whether or not ring binding is possible. In the case where the tray of the ring binding apparatus 103 is not full, a paper jam has not occurred, the rings have not been exhausted, or the like, it is determined that ring binding is possible, whereas in the case where the tray is full, a paper jam has occurred, the rings have been exhausted, or the like, it is determined that ring binding is not possible. When it has been determined that ring binding is possible, the CPU 601 advances the procedure to step S1205 (FIG. 13). However, when it has been determined that ring binding is not possible, the CPU 601 advances the procedure to step S1206, where the CPU 601 sets the job to an alternate output destination that is not the ring binding apparatus 103.

In step S1207, the CPU 601 refers to the print data and obtains the "sorted" flag. This "sorted" flag is added in step S1110 to the print data by the printer driver 650 in the case where sorting for ring binding has been carried out by the printer driver 650.

Next, in step S1208, the CPU 601 determines, based on the "sorted" flag, whether or not the print job has been sorted by the printer driver 650. Here, in the case where it has been determined that the print job has not been sorted, the procedure advances to step S1213, where the CPU 601 prints the print job according to the current page order; then, in step S1214, post-processing is carried out by the alternate output destination (for example, stapling is carried out by the saddle stitching apparatus 191), after which the processing ends.

However, in the case where it has been determined in step S1208 that the print job has been sorted by the printer driver 650, the page processing section 705 further analyzes, in step S1209, the input print job. Here, the page processing section 705 analyzes the print job, and further obtains a ring binding position setting for that print job by referring to the HDD 604 or the RAM 603.

The procedure then advances to step S1210, where the page processing section 705 determines whether the obtained ring binding position corresponds to the pattern A or the pattern B. Here, in the case where it has been determined that the ring binding position corresponds to the pattern A, the procedure advances to step S1211, where the page processing section 705 sorts the pages that have already been sorted according to the pattern A by moving the final two pages to the start of those sorted pages. However, in the case where it has been determined that the ring binding position corresponds to the pattern B, the procedure advances to step S1212, where the page processing section 705 sorts the pages that have already been sorted according to the pattern B by returning the first two pages to the end of those sorted pages. The procedure then advances to step S1213, where the page processing section 705 prints the pages in the page order that has been sorted into the proper order via the job transmission section 706; then, in step S1214, post-processing (for example, stapling) is carried out by the alternate output destination, after which the processing ends.

FIG. 13 is a flowchart for describing control carried out by the printing apparatus 100 according to the third embodiment.

In step S1301, the page processing section 705 refers to the print data, and obtains the "sorted" flag for the print job that was determined in step S1205 to be ring-bindable.

Next, in step S1302, the page processing section 705 determines whether or not the obtained "sorted" flag is set. Here, in the case where it has been determined that the pages have been sorted, the procedure advances to step S1308, where the page processing section 705 prints the pages via the job transmission section 706 without sorting those pages. Then, in step S1309, the ring binding apparatus 103 carries out ring binding directly, after which the procedure ends. On the other hand, in the case where it has been determined in step S1302 that the pages have not been sorted, the procedure advances to step S1303, where the ring binding position that is set is obtained. The procedure then advances to step S1304, where the page processing section 705 determines whether or not the obtained ring binding position is "default". In the case where it has been determined that the ring binding position is "default", the procedure advances to step S1308, where the page processing section 705 prints the pages via the job transmission section 706 without sorting those pages; then, in step S1309, the ring binding apparatus 103 carries out ring binding directly, after which the procedure ends.

On the other hand, in the case where it has been determined in step S1304 that the ring binding position is not "default", the procedure advances to step S1305, where the page processing section 705 determines whether the obtained ring binding position corresponds to the pattern A or the pattern B. In the case where it has been determined that the ring binding position corresponds to the pattern A, the procedure advances to step S1306, where the page processing section 705 sorts the pages according to the pattern A. On the other hand, in the case where it has been determined that the ring binding position corresponds to the pattern B, the procedure advances to step S1307, where the page processing section 705 sorts the pages according to the pattern B. Next, the procedure advances to step S1308, where the page processing section 705 carries out printing via the job transmission section 706 according to the page order obtained by sorting according to the pattern A or the pattern B; then, in step S1309, the ring binding apparatus 103 carries out ring binding directly, after which the procedure ends.

Through the aforementioned control, it is possible to carry out ring binding as appropriate even if the pages have already been sorted by the printer driver 650. Furthermore, it is possible to carry out printing in a page order that is suitable for an alternate output destination, even if the pages have already been sorted by the printer driver 650.

Fourth Embodiment

Figure 3A:
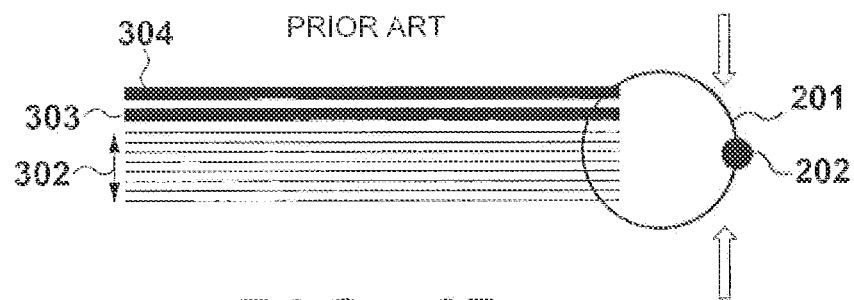
FIGS. 3A and 3B are schematic diagrams illustrating an example of a ring binding process.
Figure 3B:
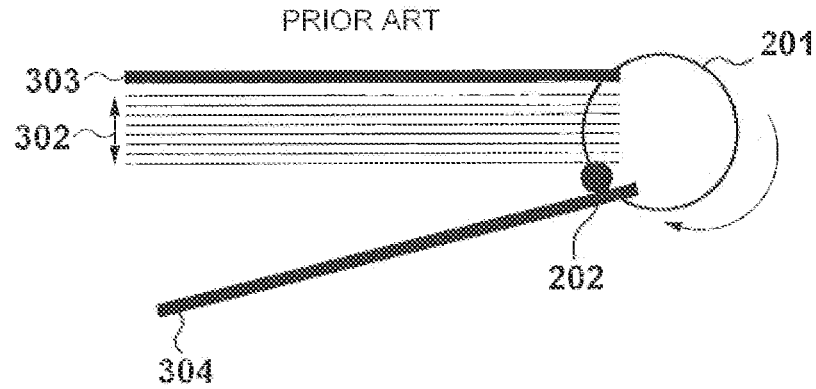
Figure 14:
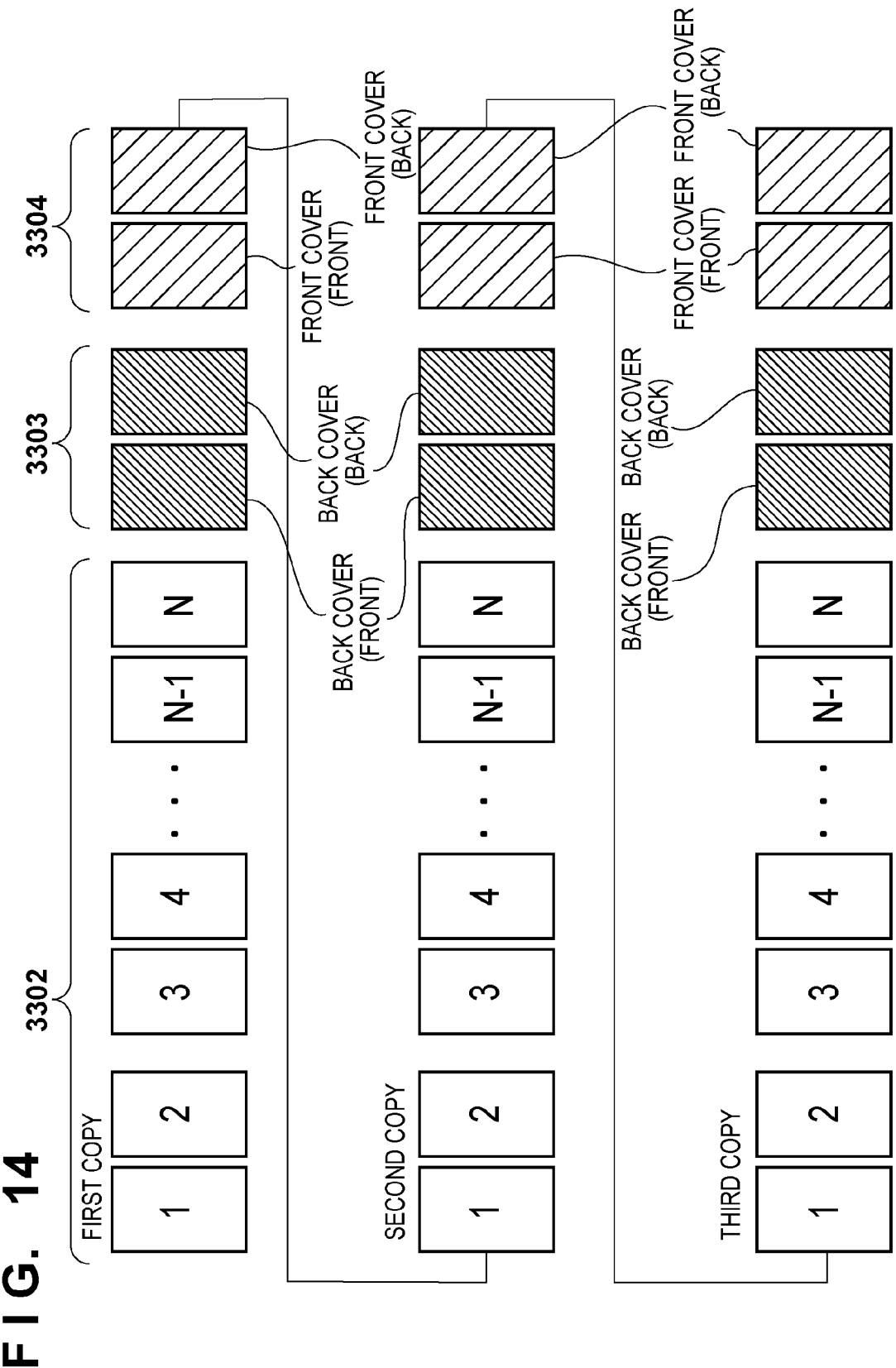
FIG. 14 is a diagram illustrating a layout of sheets (printed material) in a ring binding job.

FIG. 14 is a diagram illustrating an arrangement of sheets (printed material) in the case where multiple copies of ring binding jobs (that is, multiple jobs) are printed in succession according to the method of the pattern A shown in FIG. 5. Although the following descriptions assume that all sheets have been printed on both sides, all of the sheets may be printed on only one side, or double-sided printing and single-sided printing may be intermixed. In order to obtain an arrangement of sheets such as that shown in FIG. 3A, first, the first through Nth inner sheets 3302 are printed, after which the front and back of a back cover 3303 are printed in that order, and then the front and back of a front cover 3304 are printed in that order; thereafter, the next copy is printed.

As a characteristic of ring binding, there is a tendency, in many final products, for thicker paper to be used for the front cover 3304 and the back cover 3303 than the paper of the inner sheets 3302, on which the body is printed.

Generally speaking, in printing apparatuses that employ electrophotographic techniques, toner is melted and fixed to a sheet by a fixing device that uses a heat source. Accordingly, if the thickness of the paper changes, it is also necessary to change the temperature of the fixing device in accordance therewith. In the case where the temperature of the fixing device is raised from a low temperature to a high temperature, the temperature can be raised to the set temperature comparatively quickly by supplying a higher amount of power to the heat source. However, in the case where the temperature of the fixing device is lowered from a high temperature to a low temperature, it is necessary to stop the supply of power to the heat source and wait until the heat dissipates and cooling occurs naturally. Therefore, when lowering the temperature to a low temperature, a greater amount of time is necessary, particularly for the temperature change.

FIG. 15 as a diagram illustrating a printing time period and a temperature adjustment time period in the case where a ring binding job is executed according to the method shown in FIG. 14.

As shown in FIG. 15, first, printing is commenced from the inner pages. Then, in the case where a cover sheet is printed, it is necessary to raise the temperature of the fixing device because, as mentioned above, it is often the case that thicker paper is used for cover sheets. When the temperature of the fixing device has been raised sufficiently, the back cover and the front cover are printed, which completes the printing process for the first copy. As with the first copy, printing is commenced from the inner pages for the second copy as well. In this case, however, the temperature of the fixing device has been raised in order to print the back cover and the front cover of the first copy, and it is therefore necessary to lower the temperature of the fixing device before printing the inner sheets. For this reason, the apparatus waits until the temperature has dropped to a temperature that is suitable for printing the inner sheets, after which the printing of the second copy is commenced. In other words, it can be seen that two periods of time for adjusting the temperature of the fixing device are necessary each time a copy is printed.

A technique that, in the case where, for example, multiple copies of a job that is not a binding job but which requires the temperature of the fixing device to be adjusted are to be printed, controls the order of the printed pages to alternate between the normal order and the reverse order, is disclosed in Japanese Patent Laid-Open No. 2009-63818. By utilizing such a technique, when printing respective copies of a ring binding job, sorting and printing is carried out so that the back cover/front cover and the inner pages, respectively, are sequentially printed. Through this, it is possible to reduce the frequency at which the temperature of the fixing device is adjusted.

However, this technique poses the following problems. Japanese Patent Laid-Open No. 2009-63818 assumes as a prerequisite that the pages will be printed in reverse order. However, a situation can be considered in which a sheet that has different front and back properties, such as a sheet in which one side is coated, is specified for the cover sheet of a ring-bound volume. In order to print correctly in the reverse order, it has been necessary to invert the fronts and backs of sheets that have the same front and back properties and supply the sheets from two different paper supply units. Furthermore, sheets that cannot be printed on both sides due to mechanical restrictions of the printing apparatus, such as OHP sheets, also exist. In this case, the sheets cannot be inverted, which makes it impossible to print the sheets in the reverse order. Further still, with tabbed sheets, the order of the tabs is sorted according to a predetermined order, and therefore if the order of the tabs is also rearranged so as to alternate between the normal order and the reverse order, the desired printed material cannot be obtained.

Accordingly, the present fourth embodiment aims to improve the productivity with regards to printed materials by reducing the number of times the temperature of the fixing device is adjusted.

Note that the configurations of the printing apparatus 100 and the ring binding apparatus 103 are the same as the respective configurations of the printing apparatus 100 and the ring binding apparatus 103 according to the first embodiment, and therefore descriptions thereof will be omitted.

Figure 16A:
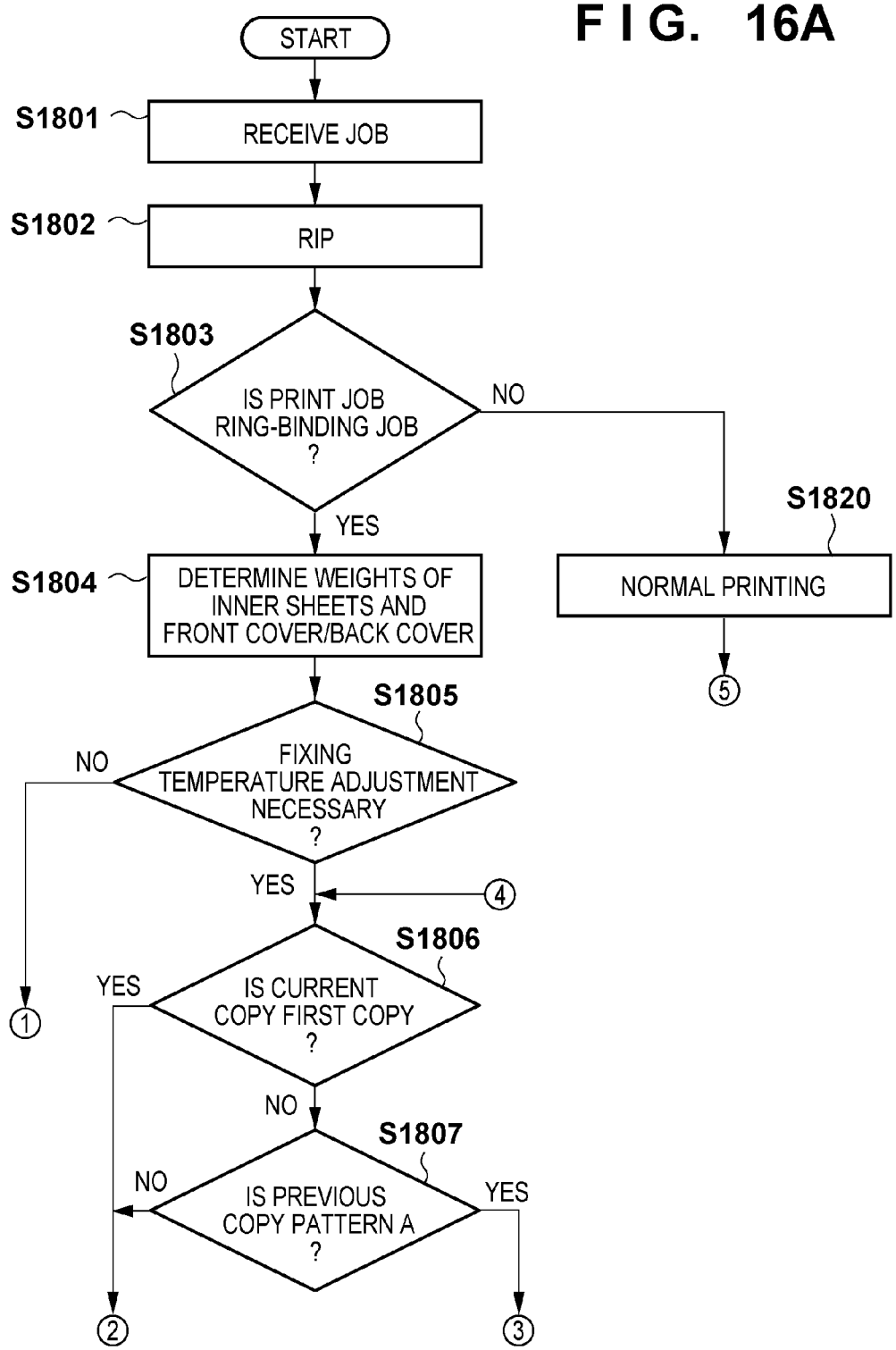

FIGS. 16A and 16B are flowcharts for describing a control process carried out by the CPU 601 of the printing apparatus 100 according to the fourth embodiment of the present invention. Note that the programs that execute these processes are, as described above, expanded in the RAM 603, and the processes indicated in this flowchart are executed by the CPU 601 executing those control programs.

First, in step S1801, the processing performed by the CPU 601 is commenced, and a print job is received via the network I/F 602. Note that it is assumed that this print job includes print data for multiple copies. Next, the procedure advances to step S1802, where the job development section 702 passes the input print job to the PDL interpreter 703. Furthermore, the RIP processing section 704 generates image data from the intermediate data generated by the PDL interpreter 703, and stores that image data in the spooler 710; the procedure then advances to step S1803.

In step S1803, the page processing section 705 analyzes the print job, and determines whether or not that print job includes ring binding. If it has been determined here that the print job is not a print job that includes ring binding, the procedure advances to step S1820, where normal printing is carried out and the procedure ends. However, the procedure advances to step S1804 in the case where it has been determined in step S1803 that the input print job is a job that includes ring binding, whereupon the page processing section 705 further analyzes the input print job and determines the weight of the sheets that are set as inner sheets and the front cover and back cover, respectively.

The procedure then advances to step S1805, where, in accordance with the weight of the sheets determined in step S1804 (that is, the type of the paper), the page processing section 705 determines whether or not it is necessary to adjust the fixing temperature of the fixing device (this corresponds to the fixing station 102 shown in FIG. 1) between the inner sheets and the front cover and back cover partway through the copy. That is, generally speaking, a thicker paper is used for the front cover or the back cover than is used for the inner sheets. Accordingly, if the weight of the paper used for the front cover and back cover is greater than or equal to a predetermined amount more than the weight of the paper used for the inner sheets, it is determined that the amount of heat required to fix printed images on the front cover or the back cover is greater than the amount of heat required to fix printed images on the inner sheets. Therefore, in such a case, it is determined that it is necessary to adjust the temperature of the fixing device.

In the case where it has been determined in step S1805 that it is not necessary to adjust the temperature of the fixing device, the procedure advances to step S1821 (FIG. 16B), where the page configuration is sorted in the order of inner sheets, back cover, and front cover (a pattern A, described later with reference to FIG. 17). The procedure then advances to step S1822, where the job transmission section 706 transmits the print data of the pages that configure the copies sorted in step S1821 to the printer engine 608, whereupon that print data is printed. When the printing of the pages that correspond to a single printed copy is completed in this manner, the procedure advances to step S1823, where the controller 130 controls the ring binding apparatus 103 to carry out ring binding on the printed sheets. Then, in step S1824, the page processing section 705 determines whether or not the printed and ring-bound copy is the final copy; in the case where that copy is determined not to be the final copy, the procedure returns to step S1821, and the processing performed by the page processing section 705 is repeated. However, in the case where the page processing section 705 has determined that the copy is the final copy in step S1824, the processing ends. Note that the procedure for the processes indicated in steps S1821 through S1824 is the same as a procedure for a known process.

Figure 17:
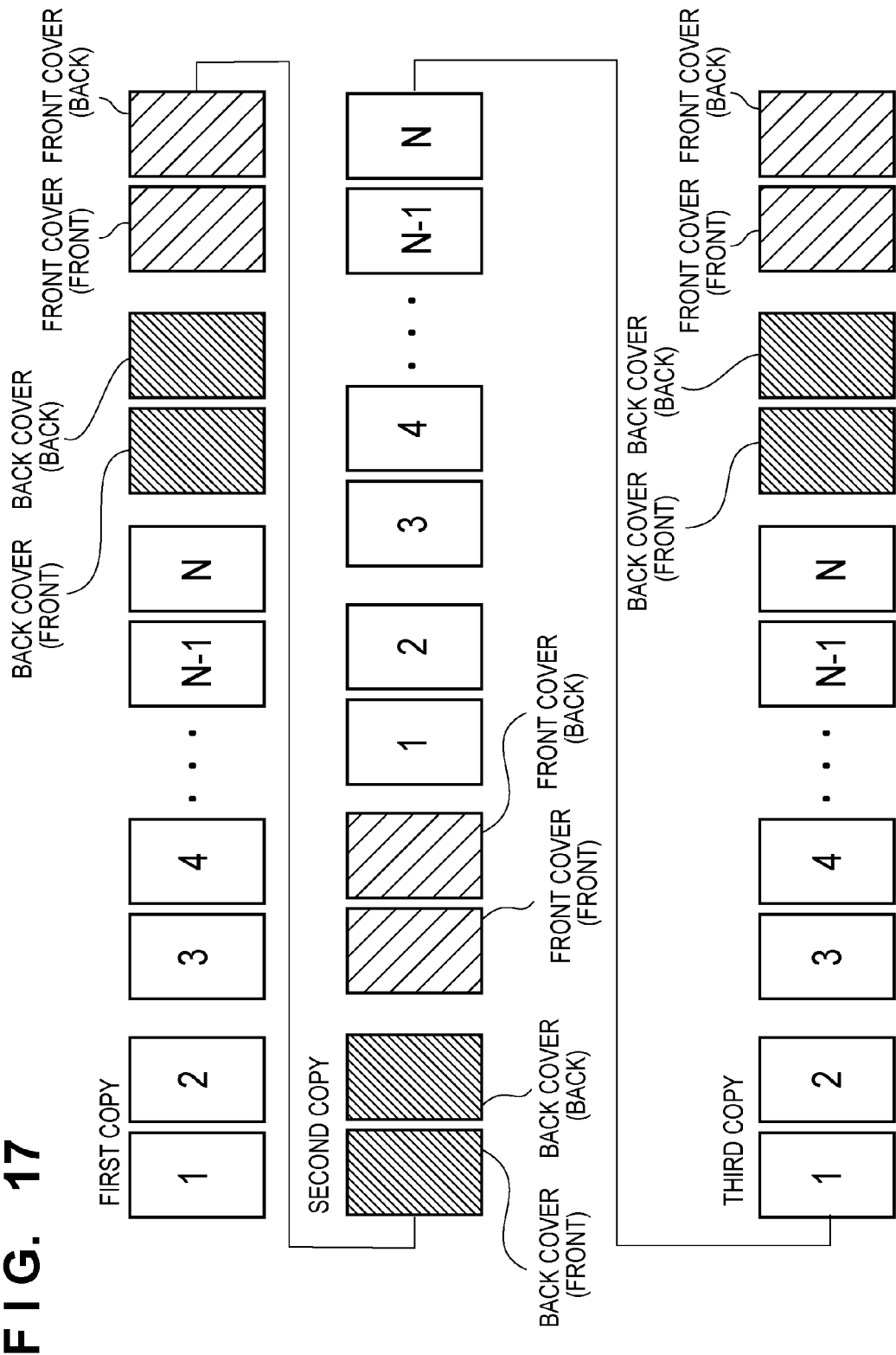
FIG. 17 is a diagram illustrating the page configuration and printing order of a print job according to an embodiment of the present invention.

FIG. 17 is a diagram illustrating the page configuration and printing order of a print job according to the fourth embodiment of the present invention.

With the first copy, the print data is sorted into the inner sheets (image data for the body), the back cover (image data for the back cover), and the front cover (image data for the front cover), in that order. This is defined as a pattern A. Then, with the second copy, the printing order is set to the back cover, the front cover, and the inner sheets, in that order. This is defined as a pattern B. Then, with the third copy, the print data is set to the inner sheets, the back cover, and the front cover, in that order, or in other words, is set to the pattern A. Likewise, with the fourth copy, the printing order is set to the back cover, the front cover, and the inner sheets, in that order, or in other words, it set to the pattern B. In this manner, the printing order is set so that the pattern A and the pattern B appear in an alternating manner. As a result, the back cover and the front cover of the first copy are printed, and the back cover and the front cover of the second copy are printed immediately thereafter, which makes it unnecessary to adjust the temperature of the fixing device between the printing of the first copy and the printing of the second copy. Likewise, the inner sheets of the second copy are printed, and the inner sheets of the third copy are printed immediately thereafter, which makes it unnecessary to adjust the temperature of the fixing device between the printing of the second copy and the printing of the third copy. Thereafter, in the same manner, it is unnecessary to adjust the temperature of the fixing device between the printing of the third copy and the printing of the fourth copy, between the printing of the fourth copy and the printing of the fifth copy, and so on.

Returning to FIG. 16A, in the case where it has been determined in step S1805 that the temperature of the fixing device needs to be adjusted, the procedure advances to step S1806, where the page processing section 705 determines whether or not the current printed copy is the first copy. Here, in the case where the page processing section 705 has determined that the current printed copy is the first copy, the procedure advances to step S1808 (FIG. 16B), where the printing order is set to the pattern A. On the other hand, in the case where the page processing section 705 has determined in step S1806 that the current printed copy is not the first copy, the procedure advances to step S1807, where it is determined whether or not the copy one copy previous to the current copy has been sorted according to the pattern A. Here, in the case where the page processing section 705 has determined that the copy that is one copy previous to the current copy has been sorted according to the pattern A, the procedure advances to step S1809 (FIG. 16B), where the printing order is set to the pattern B. Furthermore, in the case where the page processing section 705 has determined in step S1807 that the copy one copy previous to the current copy has not been sorted according to the pattern A, or in other words, that that copy has been sorted according to the pattern B, the procedure advances to step S1808 (FIG. 16B), where the copy is sorted according to the pattern A.

In this manner, when step S1808 or step S1809 is executed, the procedure advances to step S1810, where the job transmission section 706 transmits the print data that configures the copy in the printing order obtained by the sorting carried out in step S1808 or step S1809 to the printer engine 608, whereupon that print data is printed. The procedure then advances to step S1811, where the CPU 601 controls the ring binding apparatus 103 to carry out ring binding on the sheets that were printed in step S1810. Next, the procedure advances to step S1812, where the page processing section 705 determines whether or not the printed and the ring-bound copy is the final copy; the processing ends if such is the case, but if such is not the case, the procedure returns to step S1806 (FIG. 16A), where the aforementioned processing performed by the page processing section 705 is repeated.

FIGS. 10A and 10B are diagrams illustrating results of ring binding according to the fourth embodiment.

In the aforementioned pattern A, ring binding is carried out by printing inner sheets 1002 first and then printing a back cover 1001 and a front cover 1003. Accordingly, as shown in FIG. 10A, the front cover 1003 is rotated once along the rings 201, and is thus positioned in front of the inner sheets 1002. Through this, the binding position 202 is positioned immediately after the front cover 1003, and it can thus be seen that a final product that has been sorted in the intended order has been created.

On the other hand, FIG. 10B illustrates a case in which printing has been carried out according to the pattern B, where ring binding is carried out by printing a back cover 1004, a front cover 1006, and inner sheets 1005 in that order. Here, the back cover 1004 is rotated once along the rings 201, and is thus positioned behind the inner sheets 1005. Through this, the binding position 202 is positioned immediately before the back cover 1004, and it can thus be seen that a final product that has been sorted in the intended order has been created.

FIGS. 18A and 18B are diagrams illustrating a correlation between a ring binding job process in an aforementioned embodiment (FIG. 18A) and a ring binding job process according to the fourth embodiment (FIG. 18B).

In the ring binding job shown in FIG. 18A, the temperature of the fixing device is adjusted twice each time a copy is printed.

As opposed to this, with the control method according to the fourth embodiment and illustrated in FIG. 18B, cover sheets or inner sheets are printed sequentially when successive copies are printed, and thus it is only necessary to adjust the temperature of the fixing device once when printing each copy.

According to the fourth embodiment as described thus far, the number of times the temperature of the fixing device is adjusted during a ring binding job can be reduced, which makes it possible to improve the productivity.

Fifth Embodiment

Next, a fifth embodiment of the present invention will be described. Note that the configurations of the printing apparatus 100 and the ring binding apparatus 103 according to the present fifth embodiment are the same as the respective configurations of the printing apparatus 100 and the ring binding apparatus 103 according to the first embodiment, and therefore descriptions thereof will be omitted.

In the aforementioned fourth embodiment, when printing the first copy, printing is carried out according to a predetermined pattern so that the inner sheets are printed first, after which the front cover and the back cover are printed. However, in the case where it is necessary to adjust the temperature of the fixing device between the previous job and the printing of the inner sheets in the first copy, it is necessary to adjust the temperature of the fixing device prior to commencing the printing of the first copy. Accordingly, the fifth embodiment describes a method that changes the printing order of the first copy so that the temperature setting of the fixing device is the same as that for the previous job.

Figure 19A:
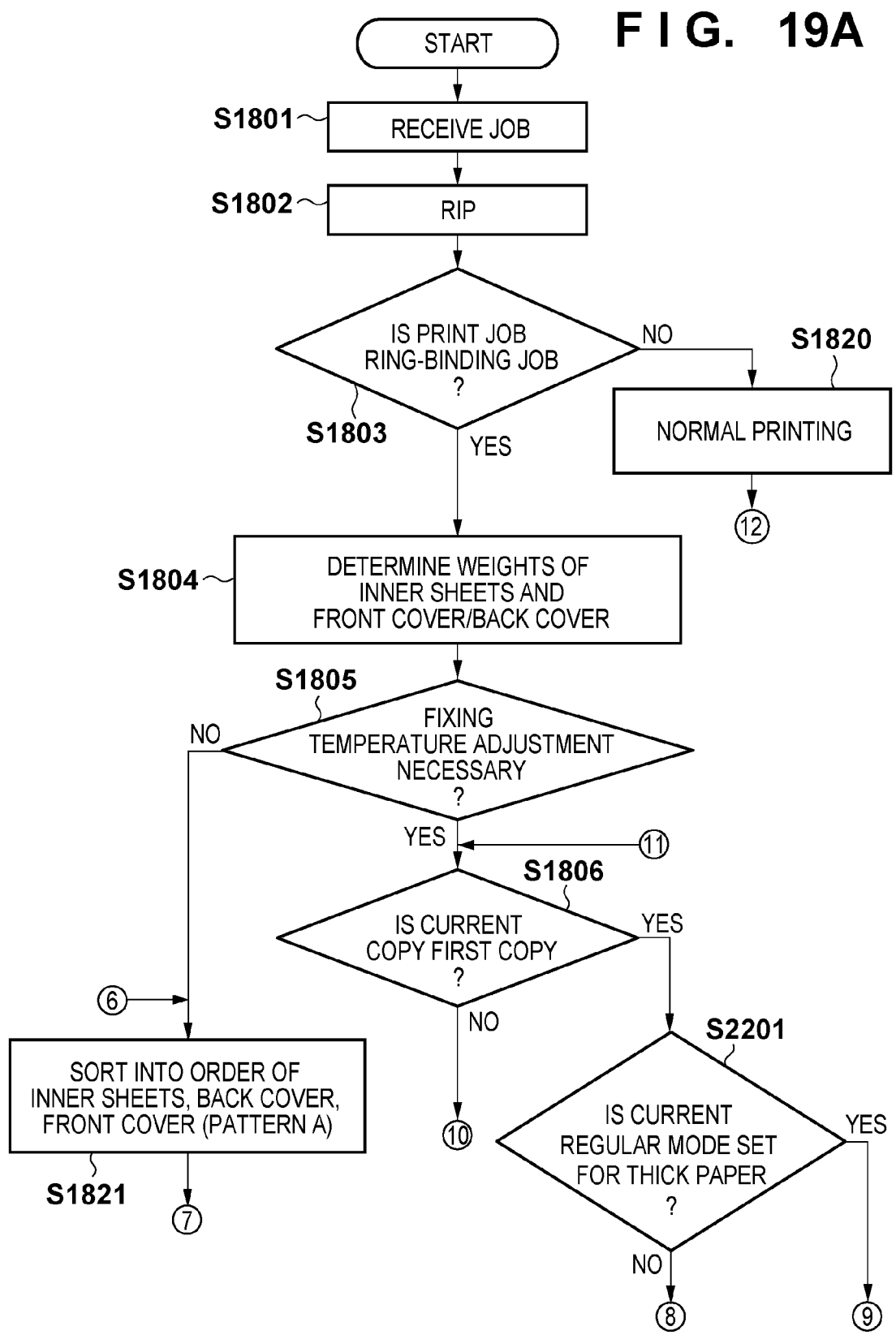
FIGS. 19A and 19B are flowcharts for describing control performed in a printing apparatus according to an embodiment of the present invention.
Figure 19B:
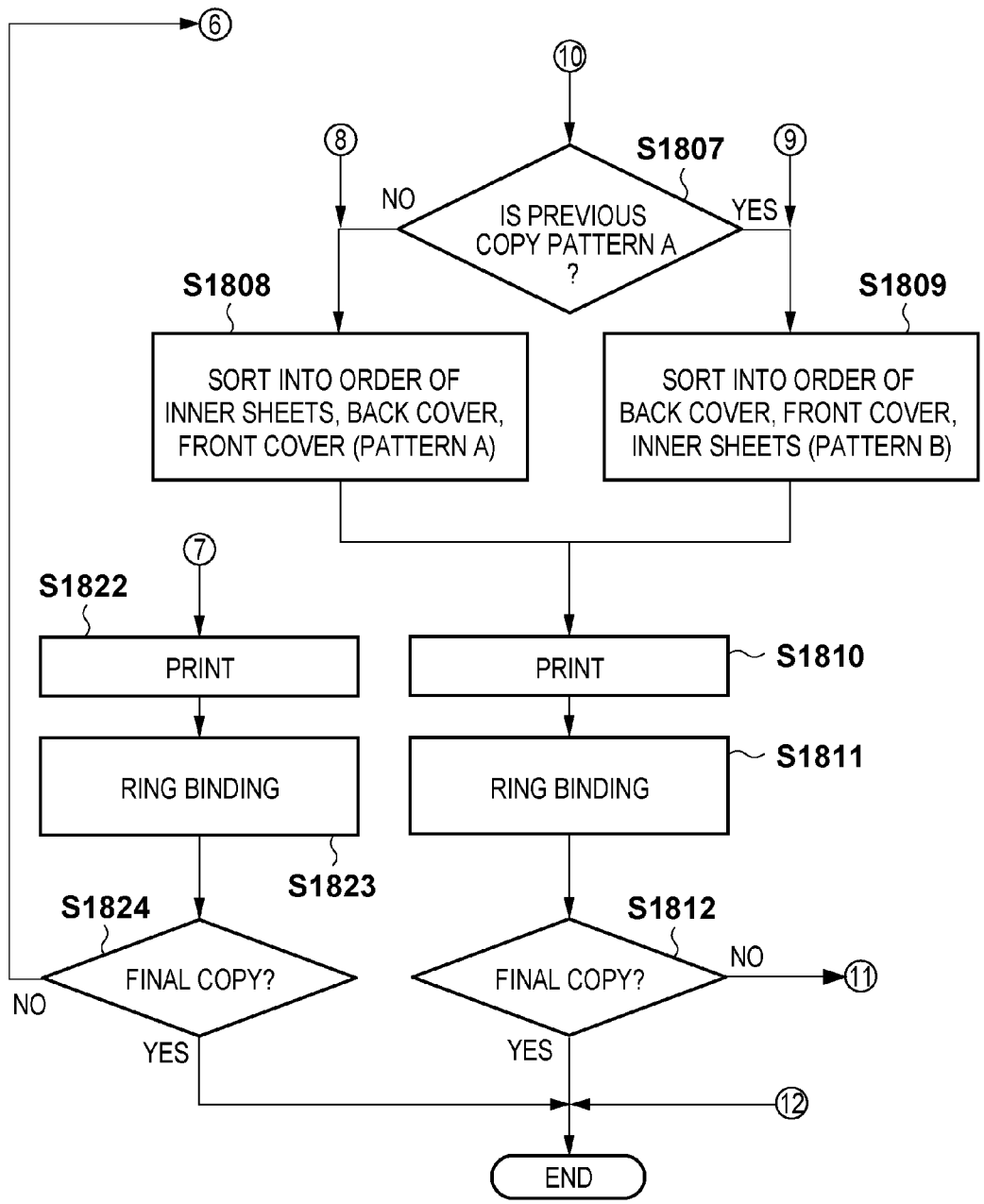

FIGS. 19A and 19B are flowcharts for describing a control process carried out by the controller 130 of the printing apparatus 100 according to the fifth embodiment of the present invention. Note that the programs that execute these processes are, as described above, expanded in the RAM 603, and the processes indicated in these flowcharts are executed by the CPU 601 executing those control programs. Furthermore, processing steps that are the same as those in the flowchart illustrated in FIGS. 16A and 16B and described in the aforementioned fourth embodiment are given the same reference numerals in FIGS. 19A and 19B, and descriptions thereof will be omitted.

In the case where it has been determined in step S1805 that the temperature of the fixing device needs to be adjusted, the procedure advances to step S1806, where the page processing section 705 determines whether or not the current printed copy is the first copy. Here, in the case where the page processing section 705 has determined that the current printed copy is the first copy, the procedure advances to step S2201, where it is determined whether or not the current temperature of the fixing device is set to a temperature that is suitable for thick paper, or in other words, is set to a temperature that is higher than normal. When it is determined in step S2201 that the current temperature of the fixing device is a temperature for fixing onto thick paper, the procedure advances to step S1809 (FIG. 19B), where the printing order is set to the back cover, the front cover, and the inner sheets, in that order, or in other words, the pages are sorted according to the pattern B. On the other hand, in the case where the page processing section 705 has determined in step S2201 that the current temperature of the fixing device is not a temperature for fixing onto thick paper, the procedure advances to step S1808 (FIG. 19B), where the printing order is set to the inner sheets, the back cover, and the front cover, in that order, or in other words, the pages are sorted according to the pattern A.

The control described thus far achieves an effect in which the printing of the first copy can be commenced without adjusting the temperature of the fixing device, even in the case where the temperature setting of the fixing device when the previous job ends is different from the temperature setting for the paper onto which printing is first carried out in the first copy.

Sixth Embodiment

Next, a sixth embodiment of the present invention will be described. Note that the configurations of the printing apparatus and the ring binding apparatus according to the present sixth embodiment are the same as the respective configurations of the printing apparatus 100 and the ring binding apparatus 103 according to the first embodiment, and therefore descriptions thereof will be omitted.

In the aforementioned fourth embodiment, when printing the first copy, the inner pages are printed first, after which the back cover and the front cover are printed. As described earlier, when adjusting the temperature of the fixing device, temperature adjustments that raise the temperature of the fixing device can be carried out in a comparatively short amount of time, but the apparatus must wait for natural heat dissipation in temperature adjustments that lower the temperature of the fixing device, which takes a long amount of time. While the difference in these amounts of time does depend upon the environment in which the printing apparatus is placed, lowering the temperature of the fixing device can take as long as five times the amount of time as required to raise the temperature of the fixing device. Accordingly, the present sixth embodiment has a characteristic in that the overall amount of time required for the print job is reduced by reducing the number of temperature adjustments made in order to lower the temperature of the fixing device.

Figure 20A:
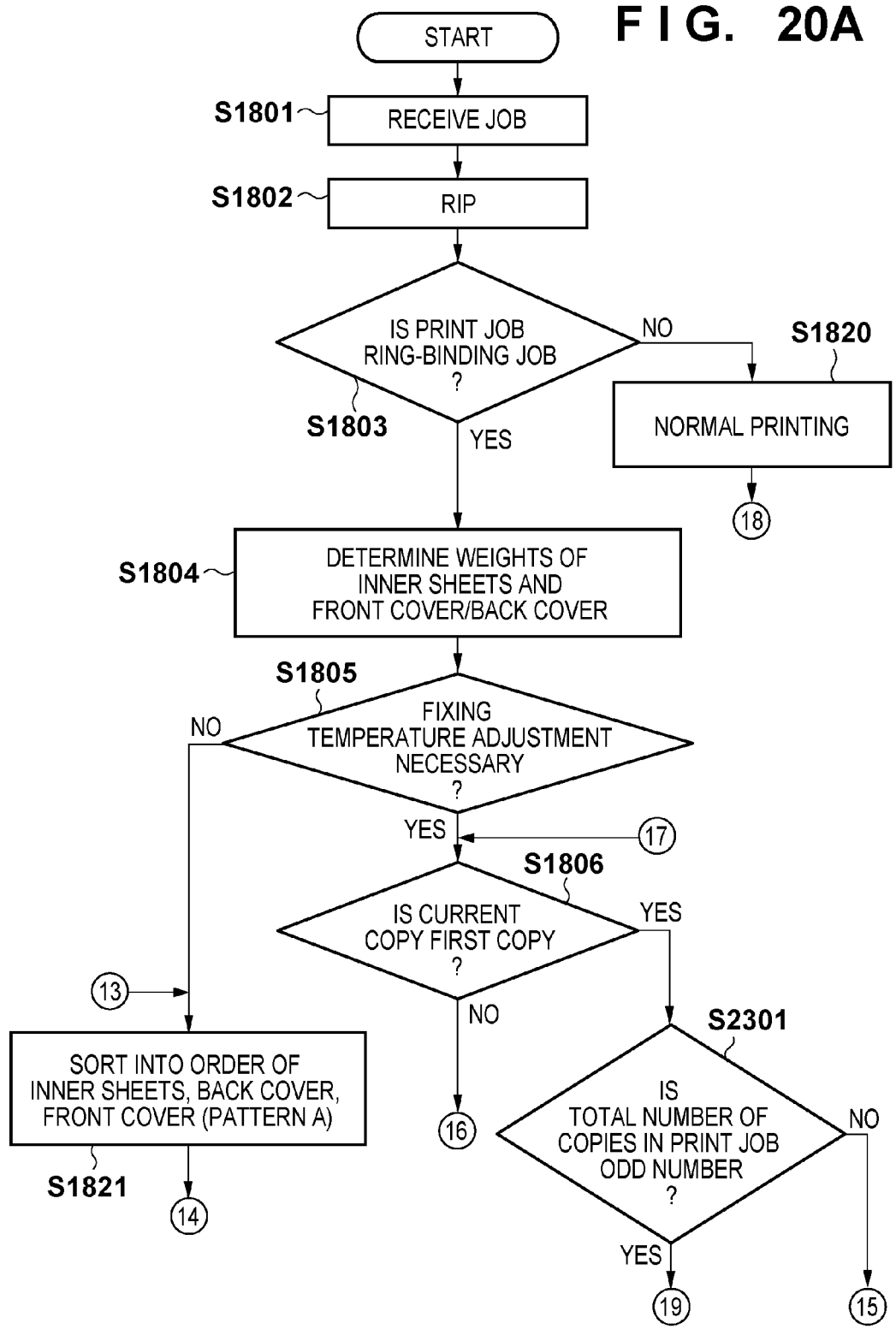
FIGS. 20A and 20B are flowcharts for describing control performed in a printing apparatus according to an embodiment of the present invention.
Figure 20B:
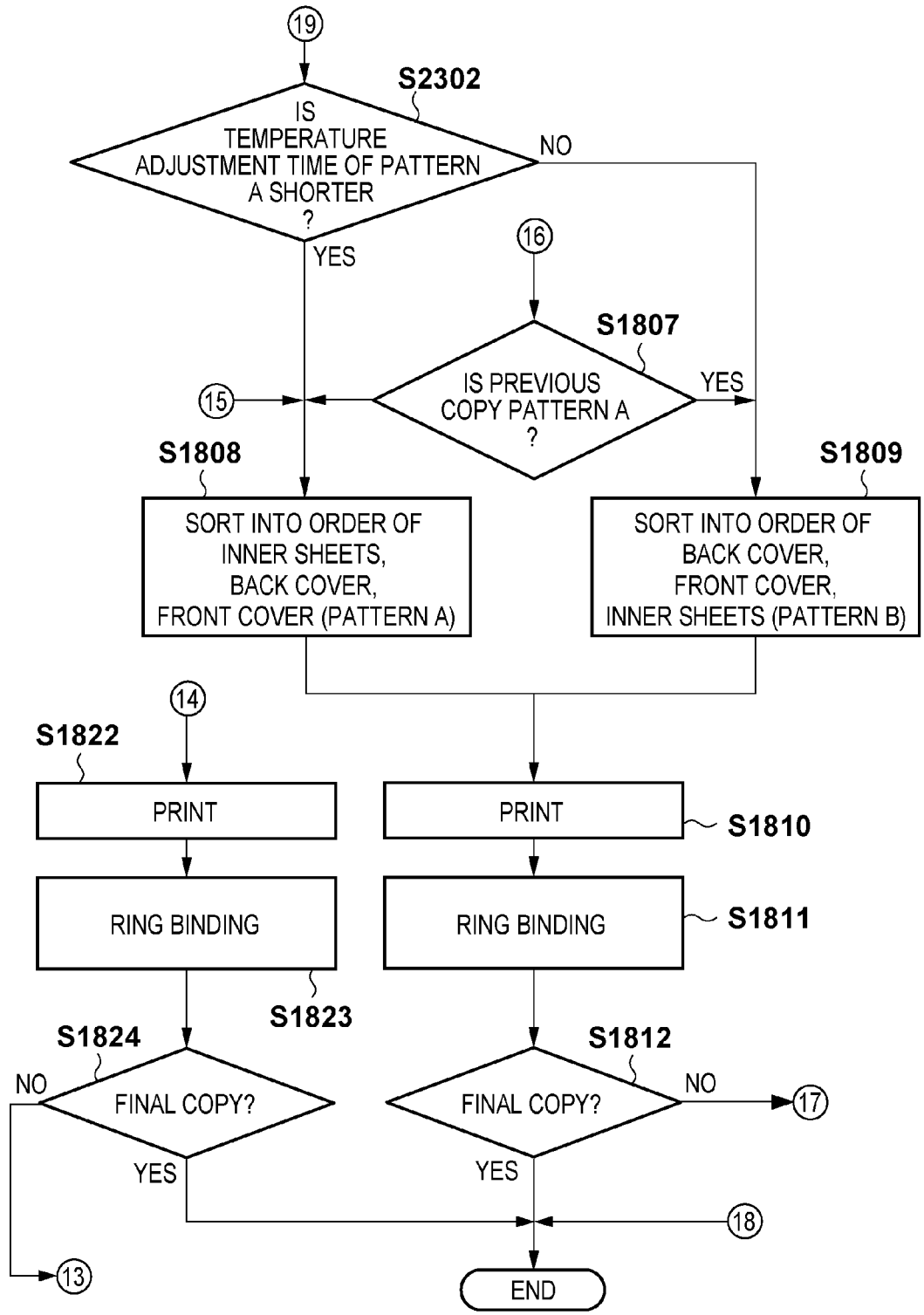

FIGS. 20A and 20B are flowcharts for describing a control process carried out by the CPU 601 of the printing apparatus 100 according to the sixth embodiment of the present invention. Note that the programs that execute these processes are, as described above, expanded in the RAM 603, and the processes indicated in this flowchart are executed by the CPU 601 executing those control programs. Furthermore, processing steps that are the same as those in the flowchart illustrated in FIGS. 16A and 16B and described in the aforementioned fourth embodiment are given the same reference numerals in FIGS. 20A and 20B, and descriptions thereof will be omitted.

In the case where it has been determined in step S1805 that the temperature of the fixing device needs to be adjusted, the procedure advances to step S1806, where the page processing section 705 determines whether or not the current printed copy is the first copy. Here, in the case where the page processing section 705 has determined that the current printed copy is the first copy, the procedure advances to step S2301, where it is determined whether or not the total number of printed copies to be printed in the print job is an odd number. In the case where the page processing section 705 has determined that the total number of copies in the print job is not an odd number, the procedure advances to step S1808 (FIG. 20B). On the other hand, in the case where the page processing section 705 has determined that the total number of copies in the print job is an odd number, the procedure advances to step S2302 (FIG. 20B), where it is determined whether or not the temperature adjustment time of the fixing device in the pattern A is shorter than the temperature adjustment time of the fixing device in the pattern B. Then, in the case where the page processing section 705 has determined that the temperature adjustment time of the fixing device in the pattern A is shorter, the procedure advances to step S1808, where the printing order is set to the inner pages, the back cover, and the front cover, in that order, or in other words, the pages are sorted according to the pattern A. On the other hand, in the case where the page processing section 705 has determined in step S2302 that the temperature adjustment time of the fixing device in the pattern B is shorter, the procedure advances to step S1809, where the printing order is set to the back cover, the front cover, and the inner pages, in that order, or in other words, the pages are sorted according to the pattern B.

Although it can be assumed that the temperature adjustment time will normally be shorter in the pattern A, it is possible that the temperature adjustment time will be shorter in the pattern B in the case where, for example, the printing apparatus according to the present embodiment is installed in an environment with an extremely low temperature. It is for this reason that the determination process in step S2302 is carried out.

According to the aforementioned control, it is possible to reduce the number of times that the fixing device temperature adjustment that takes the longer amount of time is carried out in the case where the total number of copies in the print job is an odd number, which makes it possible to improve the productivity.

Although the pattern A, which prints in order from the inner sheets, the back cover, and the front cover, is employed in the present embodiment when it is not necessary to adjust the temperature of the fixing device, it should be noted that the present invention is not limited thereto, and, for example, the pattern B, which prints in order from the back cover, the front cover, and the inner sheets, may be employed instead.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-211403, filed Sep. 21, 2010 and 2011-153272, filed Jul. 11, 2011, which are hereby incorporated by reference herein in their entirety.

What is claimed is:
1. A printing apparatus comprising:
 a reception unit configured to receive a job for printing front cover image data, main body image data, and back cover image data;
 a control unit configured to, based on binding of printed sheets using rings being designated for the job received by the reception unit, change a printing order of the image data of the received job into the main body image data, the back cover image data, and the front cover image data, or into the back cover image data, the front cover image data, and the main body image data; and
 a printing unit configured to execute printing based on the image data in the printing order changed by the control unit,
 wherein, in a case where binding of printed sheets using rings is not designated for the job received by the reception unit, the printing unit is configured to execute print- ing based on the image data in the printing order which is not changed by the control unit.

2. The printing apparatus according to claim 1, wherein in the case where it is designated to staple printed sheets for the job received by the reception unit, the printing unit executes printing based on the image data, the printing order of which is not changed by the control unit.

3. The printing apparatus according to claim 1, further comprising:
   a judging unit configured to judge whether changing of the printing order has already been performed by an information processing apparatus,
   wherein the control unit changes, based on (i) binding of printed sheets using rings being designated for the job received by the reception unit and (ii) the judging unit judging that the changing of the printing order has not already performed by the information processing apparatus, the printing order of the image data of the received job into the main body image data, the front cover image data, and the back cover image data, or into the back cover image data, the front cover image data, and the main body image data.

4. An information processing apparatus comprising:
   a receiving unit configured to receive an instruction to execute a job for printing front cover image data, main body image data, and back cover image data;
   a control unit configured to based on binding of printed sheets using rings being designated, generate a job in which a printing order of the image data is changed into the main body image data, the back cover image data, and the front cover image data, or the back cover image data, the front cover image data, and the main body image data; and
   a transmission unit configured to transmit the job, in which the printing order of the image data is changed by the control unit, to a printing apparatus,
   wherein, in a case where binding of printed sheets using rings is not designated, the transmission unit is configured to transmit the job, in which the printing order of the image data is not changed by the control unit, to a printing apparatus.

5. The information processing apparatus according to claim 4, wherein in a case where the changing has been performed by the control unit, the transmission unit transmits data indicating that the changing has already been performed by the printing apparatus.

6. A control method for controlling a printing apparatus, the method comprising:
   receiving a job for printing front cover image data, main body image data, and back cover image data;
   changing, based on binding of printed sheets using rings being designated for the received job, a printing order of the image data of the received job into the main body image data, the back cover image data, and the front cover image data, or into the back cover image data, the front cover image data, and the main body image data;
   executing printing based on the image data in the changed printing order in a case where binding printed sheets using rings is designated for the received job; and
   executing printing based on the image data in an unchanged printing order in a case where binding of printed sheets using rings is not designated for the received job.

7. A method of controlling an information processing apparatus comprising:
   receiving an instruction to execute a job for printing front cover image data, main body image data, and back cover image data;
   generating, based on binding of printed sheets using rings being designated, a job in which a printing order of the image data is changed into the main body image data, the back cover image data, and the front cover image data, or the back cover image data, the front cover image data, and the main body image data; and
   transmitting the job, in which the printing order of the image data is changed in the generating, to a printing apparatus,
   wherein, in the transmitting, transmitting the job, in which the printing order of the image data is not changed in generating, to a printing apparatus, in a case where binding of printed sheets using rings is not designated.

* * * * *